(12) United States Patent
Suzuki

(10) Patent No.: US 11,677,290 B2
(45) Date of Patent: Jun. 13, 2023

(54) MOTOR

(71) Applicant: MINEBEA MITSUMI Inc., Nagano (JP)

(72) Inventor: Tomohisa Suzuki, Kitasaku (JP)

(73) Assignee: MINEBEA MITSUMI Inc., Nagano (JP)

( * ) Notice: Subject to any disclaimer, the term of this patent is extended or adjusted under 35 U.S.C. 154(b) by 288 days.

(21) Appl. No.: 16/616,573

(22) PCT Filed: Mar. 9, 2018

(86) PCT No.: PCT/JP2018/009217
§ 371 (c)(1),
(2) Date: Nov. 25, 2019

(87) PCT Pub. No.: WO2018/220936
PCT Pub. Date: Dec. 6, 2018

(65) Prior Publication Data
US 2020/0083773 A1    Mar. 12, 2020

(30) Foreign Application Priority Data

May 31, 2017    (JP) .............................. JP2017-108831

(51) Int. Cl.
*H02K 3/52* (2006.01)
*H02K 3/50* (2006.01)
*H02K 5/22* (2006.01)

(52) U.S. Cl.
CPC ............... *H02K 3/522* (2013.01); *H02K 3/50* (2013.01); *H02K 3/52* (2013.01); *H02K 5/225* (2013.01); *H02K 2203/06* (2013.01)

(58) Field of Classification Search
CPC .... H02K 3/522; H02K 5/225; H02K 2203/06; H02K 3/50; H02K 3/38; H02K 3/34;
(Continued)

(56) References Cited

U.S. PATENT DOCUMENTS 10,236,740 B2 *   3/2019   Kimpara ................ H02K 1/146
2007/0080592 A1 *   4/2007   Ohta ........................ B60L 7/12
310/194

(Continued)

FOREIGN PATENT DOCUMENTS

CN          1953297 A       4/2007
CN        201699501 U       1/2011
(Continued)

OTHER PUBLICATIONS

First Office Action dated Feb. 23, 2021 for corresponding Chinese Application No. 201880035375.8 and English translation.
(Continued)

*Primary Examiner* — Alexander A Singh
(74) *Attorney, Agent, or Firm* — Pearne & Gordon LLP

(57) ABSTRACT

A motor according to an embodiment includes a stator and a plurality of terminals. The stator includes a tubular shape, and includes a lead wire. The stator is provided with the plurality of terminals. The plurality of terminals are arranged in a circumferential direction. Furthermore, the plurality of terminals are integrally formed with a member including electrical conductivity, and a recessed portion is formed at an outer peripheral wall portion of the member including electrical conductivity in a rotational axis direction. Moreover, the lead wire passes through the recessed portion and is wound around an inner peripheral portion and an outer peripheral portion of the stator.

6 Claims, 15 Drawing Sheets

(58) Field of Classification Search
CPC .. H02K 1/14; H02K 3/28; H02K 3/52; H02K 3/46; H02K 3/345; H02K 3/04
USPC .......................................................... 310/71
See application file for complete search history.

(56) References Cited

U.S. PATENT DOCUMENTS

| | | | |
|---|---|---|---|
| 2008/0157610 A1* | 7/2008 | Watanabe | H02K 3/522 |
| | | | 310/43 |
| 2017/0110925 A1 | 4/2017 | Fu et al. | |
| 2018/0245597 A1* | 8/2018 | Takarai | H02K 3/325 |

FOREIGN PATENT DOCUMENTS

| | | |
|---|---|---|
| CN | 204761200 U | 11/2015 |
| CN | 105356643 A | 2/2016 |
| CN | 205882881 U | 1/2017 |
| EP | 0 711 020 A | 5/1996 |
| JP | 07-059288 A | 3/1995 |
| JP | 08-228450 A | 9/1996 |
| JP | 2008-167604 A | 7/2008 |
| JP | 2013-162648 A | 8/2013 |
| JP | 2015-173544 A | 10/2015 |
| JP | 2016-178845 A | 10/2016 |
| JP | 2017-060273 A | 3/2017 |

OTHER PUBLICATIONS

English translation of the Written Opinion dated Jun. 5, 2018 for corresponding International Application No. PCT/JP2018/009217.
Second Office Action dated Aug. 9, 2021 for corresponding Chinese Application No. 201880035375.8 and English translation.
International Search Report dated Jun. 5, 2018 for corresponding International Application No. PCT/JP2018/009217.
Written Opinion dated Jun. 5, 2018 for corresponding International Application No. PCT/JP2018/009217.
Notification of Grant Patent Right dated Apr. 28, 2022 for corresponding Chinese Application No. 201880035375.8 and English translation.
Third Office Action dated Jan. 5, 2022, for corresponding Chinese Application No. 201880035375.8 and English translation.

* cited by examiner

MOTOR

FIELD

The present invention relates to motors.

BACKGROUND

A motor having a stator provided with a plurality of terminals has been conventionally known. Furthermore, the terminals are arranged separately from one another by use of independent separate members (for example, see Patent Literature 1).

CITATION LIST

Patent Literature

Patent Literature 1: Japanese Patent Application Laid-open No. 2008-167604

SUMMARY

Technical Problem

However, in the case where the terminals are arranged separately by use of the separate members according to this conventional technique, an additional circuit board for electric connection among the terminals is needed and the circuit configuration may thus become complicated.

The present invention has been made in view of the above situation, and an object of the present invention is to provide a motor having a simple circuit configuration.

Solution to Problem

It is an object of the present invention to at least partially solve the problems in the conventional technology. A motor according to an embodiment includes a stator and a plurality of terminals. The stator includes a tubular shape, and includes a lead wire. The stator is provided with the plurality of terminals, and the plurality of terminals are arranged in a circumferential direction. Furthermore, the plurality of terminals are integrally formed with a member including electrical conductivity, and a recessed portion is formed at an outer peripheral wall portion of the member including electrical conductivity in a rotational axis direction. Moreover, the lead wire passes through the recessed portion and is wound around an inner peripheral portion and an outer peripheral portion of the stator.

According to an aspect of the present invention, a motor including a simple circuit configuration is able to be provided.

DESCRIPTION OF EMBODIMENT

Figure 1:
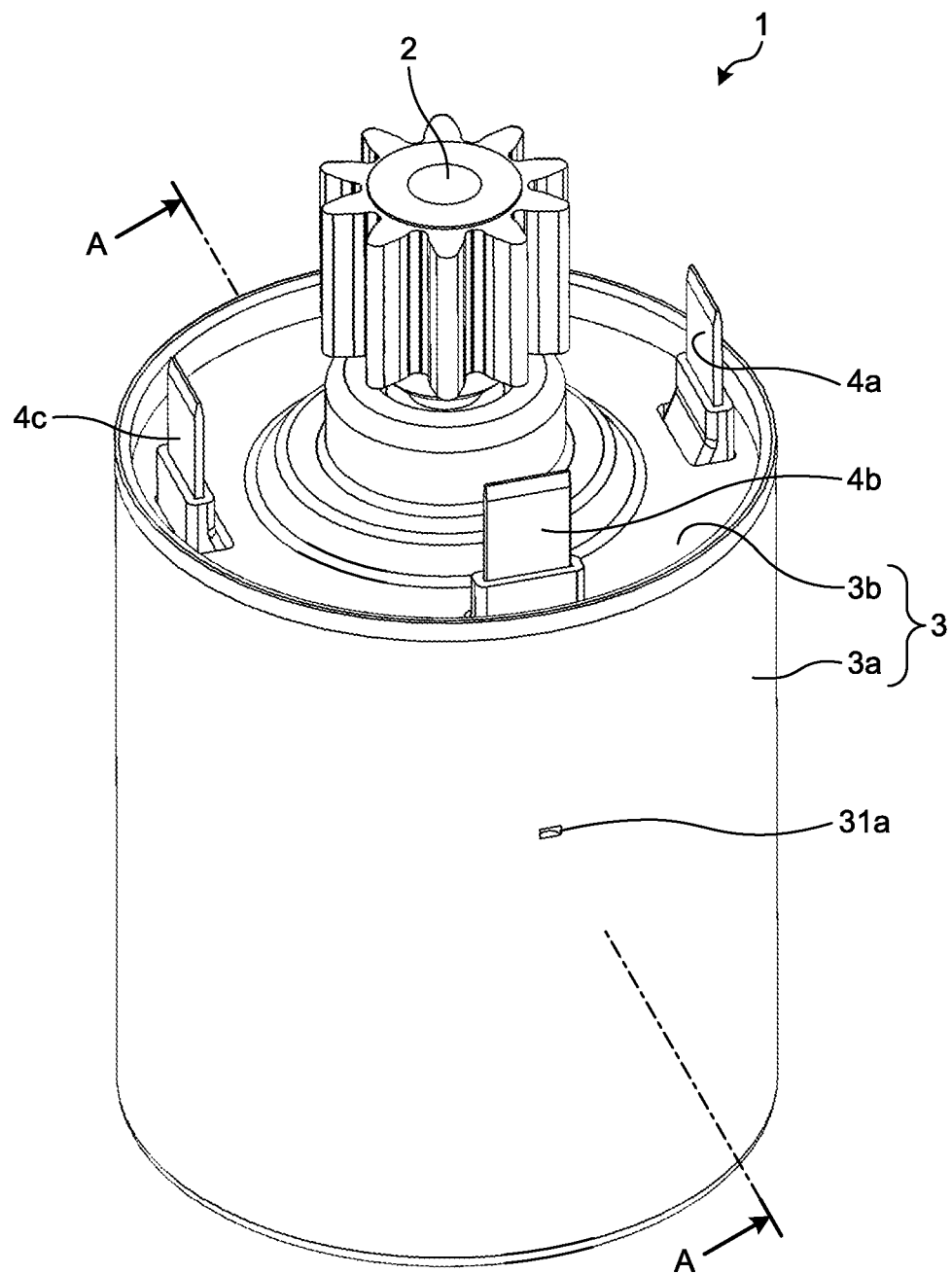
FIG. 1 is a perspective view of a motor according to an embodiment.
Figure 1:
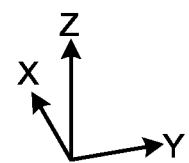

Described hereinafter by reference to the drawings is a motor according to an embodiment. The present invention is not limited by this embodiment. Furthermore, in the drawings, relations among dimensions of each element, proportions among elements, and the like may be different from the actual ones. A portion having dimensional relations and proportions that differ among the drawings may also be included. For ease of understanding of the explanation, a three-dimensional orthogonal coordinate system where the axial direction in a motor 1 is a Z-axis positive direction may be illustrated in the drawings.

EMBODIMENT

Described below with respect to the embodiment is a case where the motor 1 is an inner rotor type brushless motor, but the motor 1 may be an outer rotor type brushless motor.

Described first of all by use of FIG. 1 is the external appearance of the motor 1 according to the embodiment. As illustrated in FIG. 1, the motor 1 includes a rotating shaft 2, a frame 3, and a plurality of external terminals 4a to 4c. The motor 1 has, for example a cylindrical shape, and is rotated by supply of three-phase alternating current via the external terminals 4a to 4c.

The rotating shaft 2 extends in an axial direction in the motor 1, and one end portion (in the Z-axis positive direction) of the rotating shaft 2 has a power transmission mechanism, such as, for example, a gear, provided rotatably with the rotating shaft 2, the one end portion protruding from the frame 3 described later. Hereinafter, the axial direction in the motor 1 may be referred to as a rotational axis direction, the axial direction being a Z-axis direction.

The frame 3 is formed of a metal member including a metallic material, such as, for example, iron or aluminum; and includes a housing portion 3a, a lid portion 3b, and a bottom portion 3c. The housing portion 3a is tubular, and more specifically, cylindrical, and has, accommodated in internal space of the housing portion 3a, a stator, a rotor, and the like, and the stator and the rotor will be described later.

The lid portion 3b is a lid covering an opening at one end portion of the housing portion 3a, the one end portion being in the Z-axis positive direction. Furthermore, through holes are arranged on the lid portion 3b. The rotating shaft 2 and the external terminals 4a to 4c pass through the through holes.

The external terminals 4a to 4c are formed of, for example, an electrically conductive metallic material, extend portion in the rotational axis direction, that is, the Z-axis direction, and protrude from the frame 3. Accordingly, three-phase alternating current is able to be supplied from an external power source to the motor 1 via the external terminals 4a to 4c.

Furthermore, the external terminals 4a to 4c pass through the through holes in the lid portion 3b of the frame 3, and protrude in the rotational axis direction. The three external terminals 4a to 4c respectively correspond to phases of the three-phase alternating current (a U-phase, a V-phase, and a W-phase). Hereinafter, the three external terminals 4a to 4c may be collectively referred to as external terminals 4.

Figure 2:
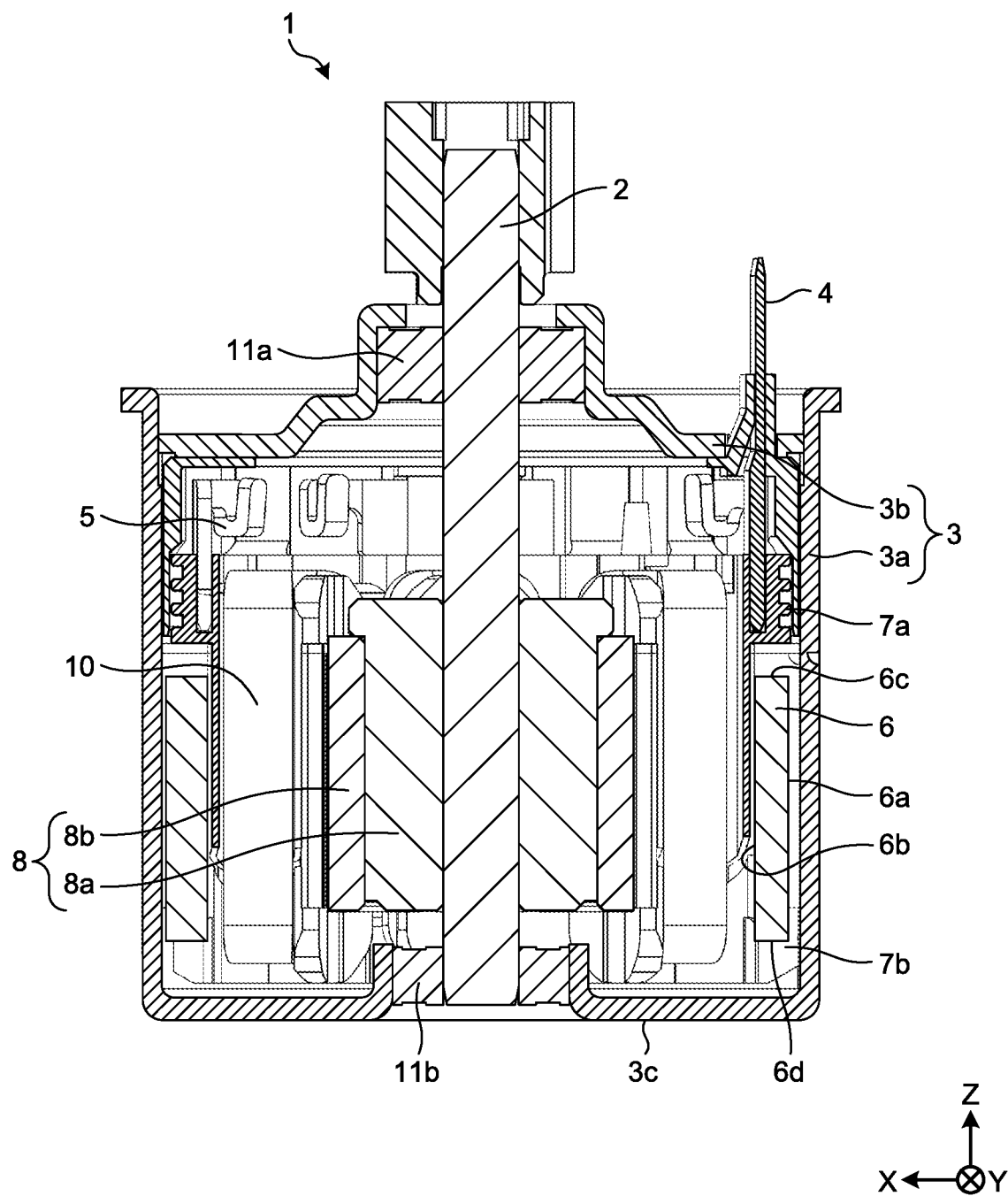
FIG. 2 is a sectional view of the motor according to the embodiment.
Figure 3:
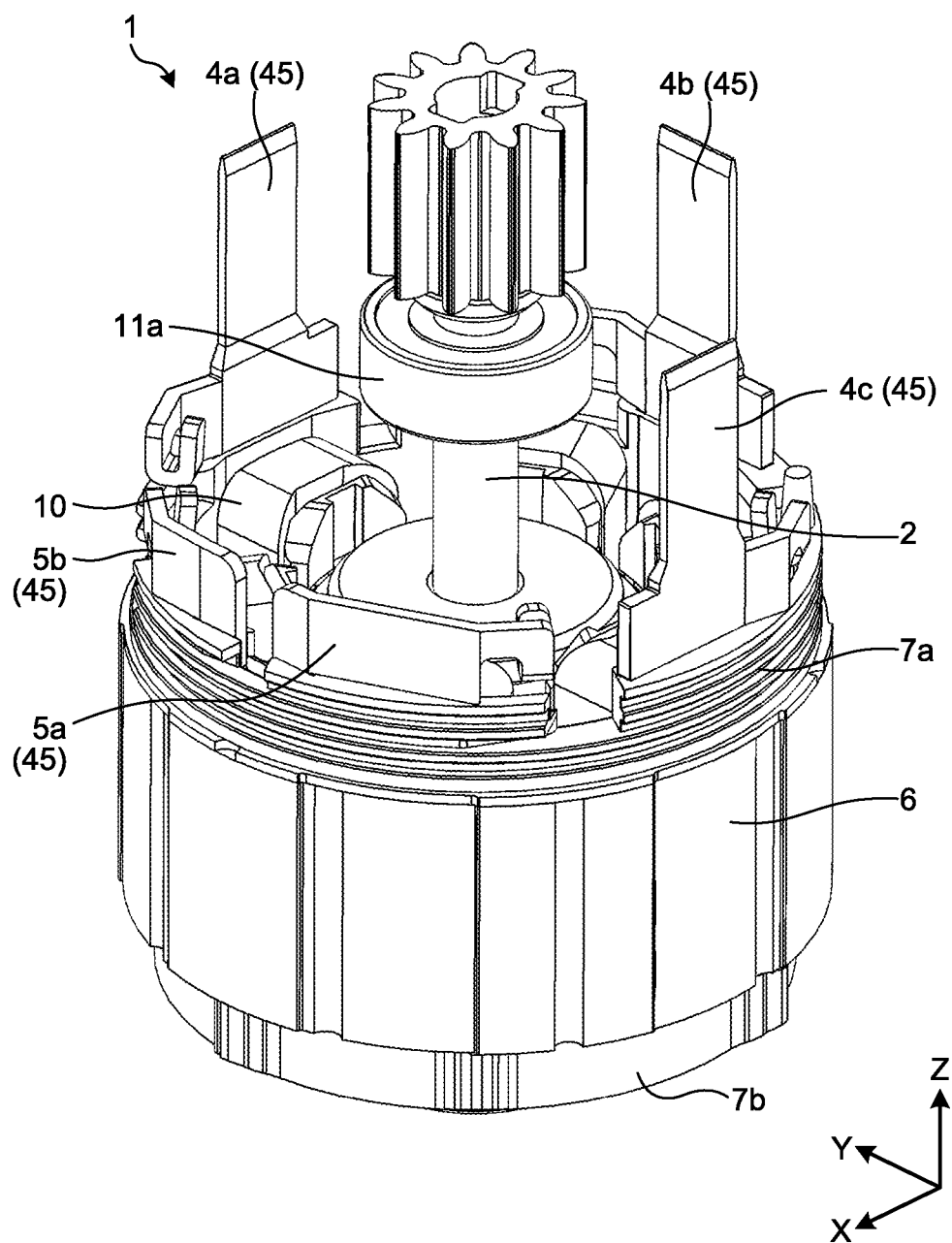
FIG. 3 is a perspective view of the motor according to the embodiment.

Described next by use of FIG. 2 and FIG. 3 is an internal structure of the motor 1. FIG. 2 is a sectional view of the motor 1 according to the embodiment. FIG. 2 shows a cross section of the motor 1, the cross section having been cut along an A-A line illustrated in FIG. 1. FIG. 3 is a perspective view of the motor 1 according to the embodiment. In FIG. 3, for visibility, illustration of the frame 3 has been omitted.

As illustrated in FIG. 2 and FIG. 3, the motor 1 further includes: internal terminals 5a and 5b (the internal terminals 5a and 5b collectively referred to as internal terminals 5), a stator 6, insulators 7a and 7b, a rotor 8, and bearings 11a and 11b.

The stator 6 has a tubular magnetic member (an example of a magnetic body). The magnetic member is formed of plate-like metallic members, such as soft magnetic steel plates, for example, silicon steel plates or electromagnetic steel plates. Specifically, the stator 6 is formed of these a plurality of plate-like metallic members stacked in the rotational axis direction.

The stator 6 is not necessarily formed of the stacked metallic members, and may be integrally formed of a single metallic member.

Furthermore, as illustrated in FIG. 2, the stator 6 has an outer peripheral portion 6a facing with the housing portion 3a of the frame 3, an inner peripheral portion 6b, and end faces 6c and 6d in the rotational axis direction that is the Z-axis direction. An end face may be a surface at the extreme end in the Z-axis direction, such as a top surface facing the exterior or a bottom surface facing the exterior.

Furthermore, the stator 6 has a lead wire. Specifically, a part of the lead wire of the stator 6 is wound around the outer peripheral portion 6a side and the inner peripheral portion 6b side, via the insulator 7a described later.

The lead wire is a member having a wire formed of electrically conductive metal, such as copper, and being covered with an insulating member. The lead wire forms coils 10 in the inner peripheral portion 6b of the stator 6.

The coils 10 surround the magnetic member of the stator 6. Specifically, the lead wire forms the coils 10 in the inner peripheral portion 6b of the stator 6 by being wound around the magnetic member (teeth) clockwise or counterclockwise, anticlockwise, via the insulators 7a and 7b described later.

The rotor 8 is a rotating body in the motor 1, and includes a yoke 8a and a magnet 8b. Furthermore, the rotor 8 is provided along the inner peripheral portion 6b of the stator 6. In other words, the rotor 8 is of a so-called inner-rotor type motor. The rotor 8 is not necessarily of the inner rotor type, and may be provided along the outer peripheral portion 6a of the stator 6. In other words, the rotor 8 may be of a so-called inner-rotor type motor.

The yoke 8a has a through hole, and the rotating shaft 2 passes through the through hole. The yoke 8a is fixed to the rotating shaft 2 at a position where the yoke 8a is concentric with the rotating shaft 2. The magnet 8b is a tubular permanent magnet. An inner peripheral surface of the magnet 8b is fixed to an outer peripheral surface of the yoke 8a, and an outer peripheral surface of the magnet 8b faces the inner peripheral portion 6b of the stator 6. Furthermore, a magnetic gap is formed between the magnet 8b and the inner peripheral portion 6b of the stator 6, in a radial direction of the motor 1. Accordingly, the rotor 8 is rotated, due to a magnetic field generated in the stator 6.

The insulators 7a and 7b are each, for example, a tubular insulating member formed of an insulating material, such as resin, and are provided at the stator 6. Specifically, the insulators 7a and 7b are provided at positions where the insulators 7a and 7b cover the stator 6. More specifically, the insulators 7a and 7b cover a part of the end portion faces 6c and 6d of the stator 6 and a part of the inner peripheral portion 6b of the stator 6.

For example, the insulator 7a covers: a part of the end portion face 6c out of the end portion faces 6c and 6d of the stator 6, the end portion face 6c being at the external terminal 4 side; and a part of the inner peripheral portion 6b, the part being at the external terminal 4 side. Furthermore, the insulator 7b covers a part of the other end portion face 6d and a part of the inner peripheral portion 6b, the part being other than the part of the inner peripheral portion 6b covered by the insulator 7a.

The internal terminals 5a and 5b extend portion in the rotational axis direction, that is, the Z-axis direction, and are accommodated in the housing portion 3a of the frame 3. Furthermore, the internal terminals 5a and 5b are integrally formed of a single electrically conductive member, and this formation will be described later by reference to FIG. 9.

Furthermore, as illustrated in FIG. 3, the internal terminals 5 are provided at the insulator 7a. Specifically, the internal terminals 5a and 5b are provided at a side on the insulator 7a, the side being opposite to the stator 6 (in the Z-axis positive direction). In other words, the internal terminals 5a and 5b are provided at the stator 6 via another member (the insulator 7a in FIG. 3).

Furthermore, as illustrated in FIG. 3, the above described external terminals 4 are also provided at the insulator 7a, similarly to the internal terminals 5a and 5b. Specifically, the internal terminals 5a and 5b and the external terminals 4a and 4c are arranged side by side in a circumferential direction. The arrangement of the internal terminals 5a and 5b and the external terminals 4a to 4c will be described in more detail later by reference to FIG. 11.

The internal terminals 5a and 5b and the external terminals 4a and 4c may be collectively referred to as terminals 45. That is, the terminals 45 are provided at the insulator 7a.

The bearings 11a and 11b are each a bearing including a through hole, and the rotating shaft 2 passes through the through hole. The bearings 11a and 11b support the rotating shaft 2. The bearing 11a is provided at the external terminal 4 side of the rotor 8, the external terminal 4 side being in the Z-axis positive direction, and the bearing 11b is provided at a side opposite to the bearing 11a.

Figure 4:
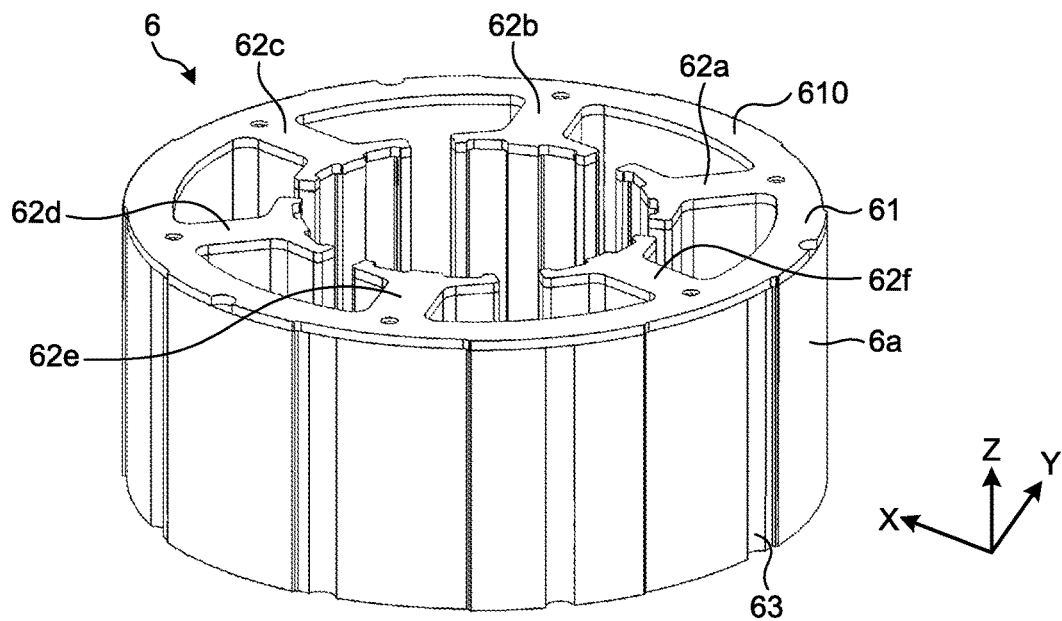
FIG. 4 is a perspective view of a stator according to the embodiment.
Figure 5:
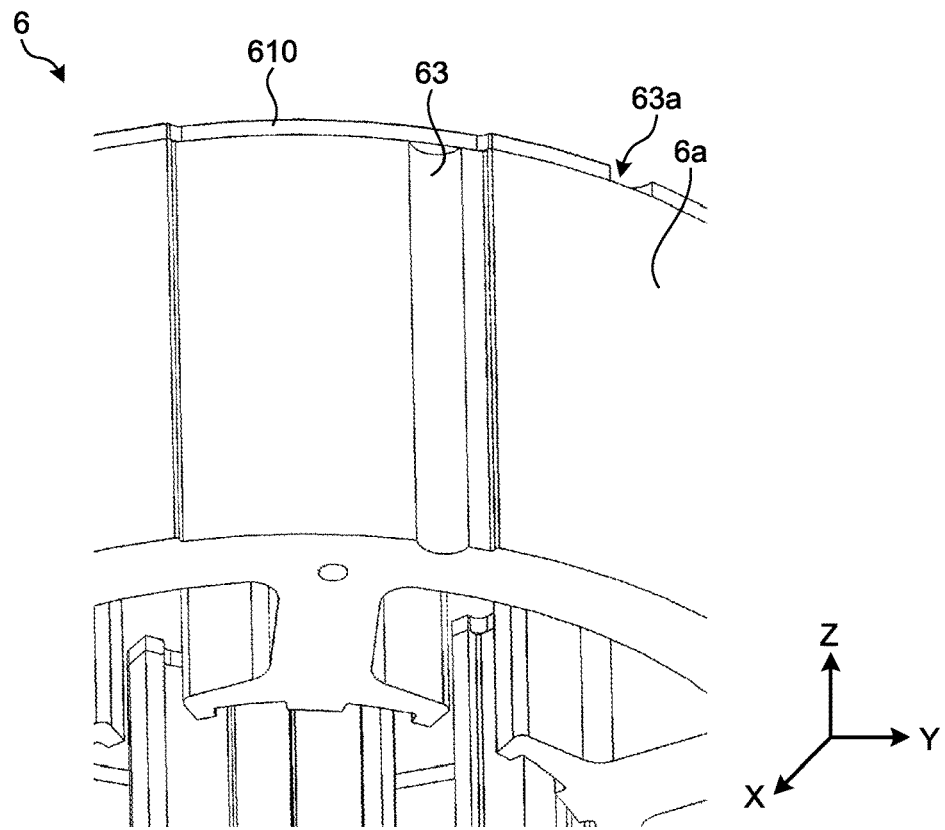
FIG. 5 is a perspective view of the stator according to the embodiment.

Next, the stator 6 will be described in detail by use of FIG. 4 and FIG. 5. FIG. 4 and FIG. 5 are perspective views of the stator 6 according to the embodiment. FIG. 4 is a perspective view as viewed from the Z-axis positive direction, and FIG. 5 is a perspective view as viewed from a Z-axis negative direction.

Furthermore, FIG. 4 and FIG. 5 illustrate only a metallic member 610 at an end portion at the external terminal 4 side (see FIG. 2) out of the metallic members forming the stator 6, and integrally illustrate the other metallic members.

As illustrated in FIG. 4, the stator 6 includes a tubular core 61, and a plurality of teeth 62a to 62f. The teeth 62a to 62f are arranged in the circumferential direction with respect to the core 61, and extend in the radial direction. More specifically, the teeth 62a to 62f are arranged side by side in the circumferential direction, outside the rotor 8.

Furthermore, each of the teeth 62a to 62f faces with one of the teeth 62a to 62f in the radial direction. For example, the tooth 62a and the tooth 62d face with each other, the tooth 62b and the tooth 62e face with each other, and the tooth 62c and the tooth 62f face with each other.

The number of teeth 62a to 62f illustrated in FIG. 4 is six, but the number of teeth may be two, or equal to or greater than seven. The teeth 62a to 62f may hereinafter be collectively referred to as teeth 62.

Furthermore, each of the teeth 62a to 62f is provided with a coil 10. Specifically, the coils 10 surround the teeth 62a to 62f via the insulators 7a and 7b (see FIG. 3).

Furthermore, as illustrated in FIG. 4, the stator 6 has one or a plurality of recessed portions 63 provided in the outer peripheral portion 6a. Specifically, the plurality of recessed portions 63 are arranged in the circumferential direction and extend in the rotational axis direction.

That is, the recessed portions 63 are formed by recessed portions of the metallic members being stacked to be at substantially the same positions in the circumferential direction. The recessed portions 63 face with protruding portions of the frame 3 described later, and this will be described later by use of FIG. 7.

The plurality of recessed portions 63 are not necessarily provided in the outer peripheral portion 6a of the stator 6, as long as the outer peripheral portion 6a is provided with at least one recessed portion 63. Furthermore, the recessed portions 63 do not necessarily extend straight in the rotational axis direction, and may extend in a curved manner in the rotational axis direction. Moreover, the recessed portions 63 are continuously formed from the one end portion face 6c of the stator 6 to the other end portion face 6d of the stator 6, but may be continuously formed from an intermediate position between the one end portion face 6c and the other end portion face 6d to one of these end portion faces.

Furthermore, as illustrated in FIG. 5, in the stator 6, the metallic member 610 being an end portion at the external terminal 4 side covers an end portion of the recessed portions 63. In other words, in the stator 6, the recessed portions 63 are provided in the outer peripheral portion 6a of the other metallic members out of the metallic members, and the other metallic members are different from the metallic member 610 adjacent to the external terminal 4.

The recessed portions 63 are provided in the other metallic members other than the metallic member 610 being closest to the external terminal 4. The metallic member 610 contacts the frame 3, and this will be described later by reference to FIG. 8.

Furthermore, as illustrated in FIG. 5, the metallic member 610 is provided with recessed portions 63a at positions different from those of the recessed portions 63 in the circumferential direction. That is, the metallic member 610 is provided rotated in the circumferential direction by a predetermined angle from the other metallic members. The rotated angle is an angle at which the teeth 62 are overlapped. Accordingly, in the metallic members having, formed in the metallic members, the teeth 62a, 62b, 62c, 62d, and 62e described later, the recessed portions 63a are able to be formed in the metallic member arranged closest to the external terminal 4, and the recessed portions 63 are able to be formed in the other metallic members at positions different from those of the recessed portions 63a. Accordingly, except for the recessed portions 63 and 63a, an additional metallic member 610 having a shape different from the shape of the other metallic members does not necessary made, and thus the cost is able to be reduced.

In FIG. 4, the recessed portions 63a of the single metallic member 610 are provided at positions rotated from the recessed portions 63 of the other metallic members by a predetermined angle, but the metallic members may be similarly provided with the recessed portions 63a. That is, the recessed portions 63 are covered by the single metallic member 610, but the recessed portions 63 may be covered by some of the metallic members.

Furthermore, the recessed portions 63a are provided in the metallic member out 610 of the metallic members, the metallic member 610 being closest to the external terminal 4, but the recessed portions 63a are not necessarily provided in the metallic member 610 closest to the external terminal 4, and may be provided in any metallic member at the external terminal 4 side.

Specifically, the recessed portions 63a may be provided in a metallic member closer to the external terminal 4 than a metallic member that is in the middle of the metallic members in the rotational axis direction.

Furthermore, the recessed portions 63 are covered by the metallic member 610 being one of the metallic members forming the stator 6, but the recessed portions 63 may be covered by a member different from the metallic members of the stator 6. Or, the recessed portions 63 may be covered by the insulator 7a.

Figure 6:
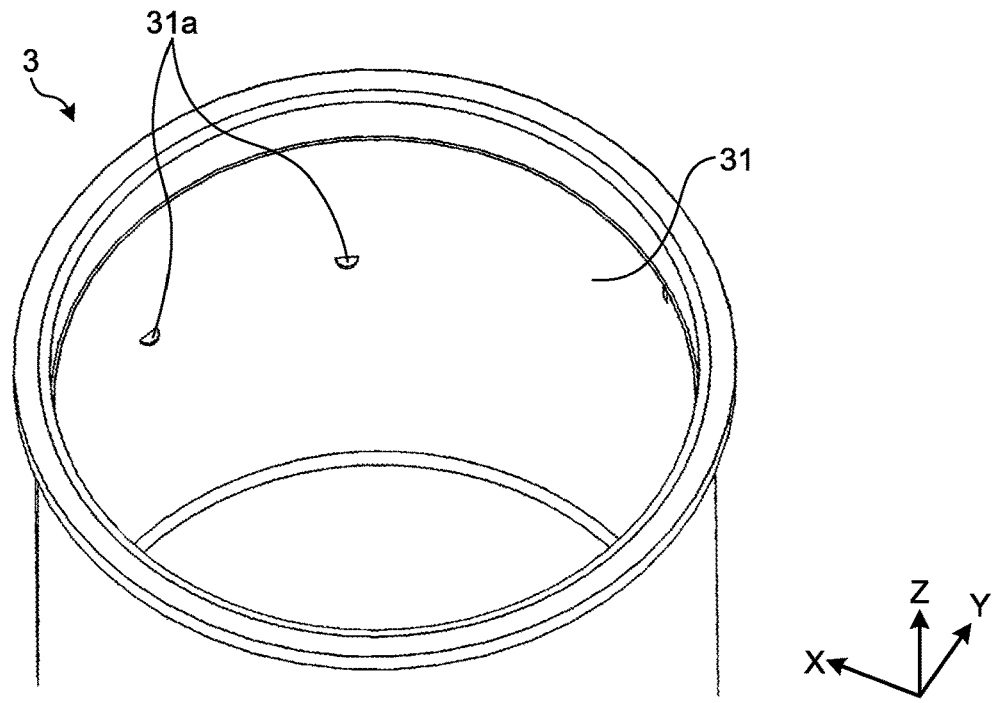
FIG. 6 is a perspective view of a frame according to the embodiment.
Figure 7:
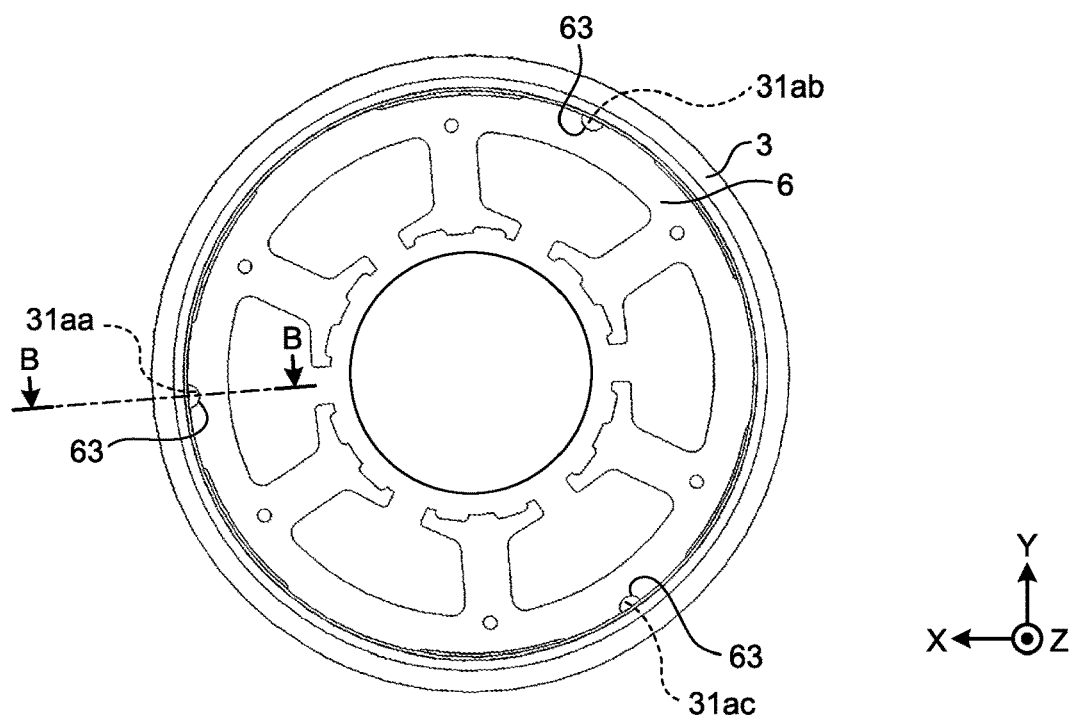
FIG. 7 is a top view of the frame according to the embodiment.
Figure 8:
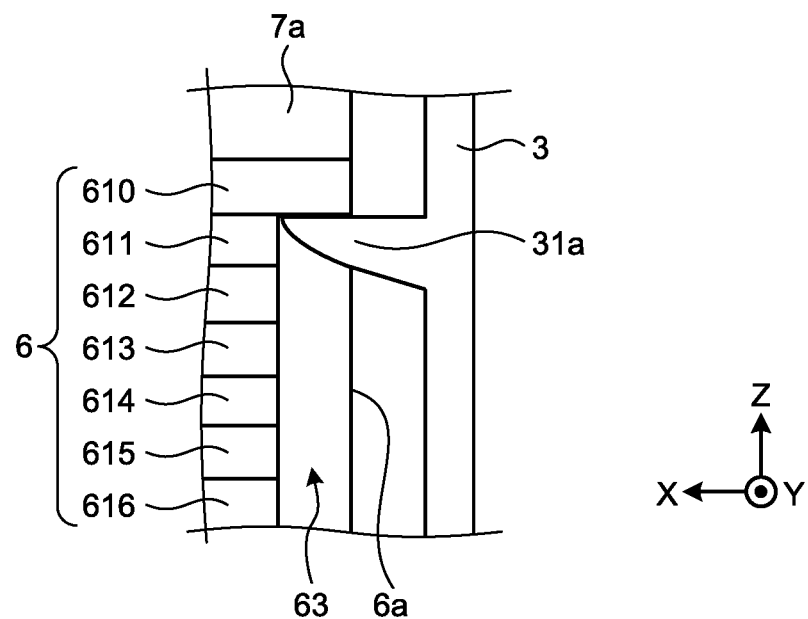
FIG. 8 is a sectional view of the frame according to the embodiment.

Described next by use of FIG. 6 to FIG. 8 is the frame 3. FIG. 6 is a perspective view of the frame 3 according to the embodiment. FIG. 7 is a top view of the frame 3 according to the embodiment. FIG. 8 is a sectional view of the frame 3 according to the embodiment. FIG. 8 is a sectional view cut along a B-B line illustrated in FIG. 7.

As illustrated in FIG. 6, the frame 3 has protruding portions 31a in an inner peripheral portion 31 of the frame 3. Specifically, a part of the inner peripheral portion 31 of the frame 3 is the protruding portions 31a protruding to the outer peripheral portion 6a of the stator 6 (see FIG. 2) in the radial direction.

Positions of the protruding portions 31a in the circumferential direction correspond to the recessed portions 63 of the stator 6, and positions of the protruding portions 31a in the rotational axis direction correspond to the metallic member 610 of the stator 6. This will be described by use of FIG. 7 and FIG. 8.

FIG. 7 and FIG. 8 illustrate a positional relation between the frame 3 (the protruding portions 31a) and the stator 6. As illustrated in FIG. 7, the frame 3 is provided with a plurality of protruding portions 31aa to 31ac.

Specifically, the protruding portion 31aa is provided at one side, and the two protruding portions 31ab and 31ac are provided at other sides. The number of the protruding portions 31a is one or more, and may be three or more.

Each of the protruding portions 31aa to 31ac is in contact with the outer peripheral portion 6a of the stator 6. Specifically, each of the protruding portions 31aa to 31ac is in contact with the metallic member 610. That is, the stator 6 is supported by the protruding portions 31aa to 31ac of the frame 3.

Furthermore, as illustrated in FIG. 7, the protruding portions 31aa to 31ac face with the recessed portions 63 of the stator 6 in the radial direction. More specifically, the protruding portions 31aa to 31ac are inside the recessed portions 63. This will be described by use of FIG. 8.

FIG. 8 illustrates a positional relation between the stator 6 and the protruding portions 31a in the rotational axis direction. Furthermore, FIG. 8 illustrates the metallic member 610 closest to the external terminal 4 (see FIG. 2), and other metallic members 611 to 616.

As illustrated in FIG. 8, an end portion of the protruding portion 31a is positioned at an inner side in an X-direction positive direction than the outer peripheral portion 6a of the stator 6 in the radial direction. Specifically, the end portion of the protruding portion 31a is positioned inside the recessed portion 63 formed of the other metallic members 611 to 616 out of the metallic members 610 to 616, the other metallic members 611 to 616 being other than the metallic member 610 adjacent to the insulator 7a.

Furthermore, inside the recessed portion 63, the protruding portion 31a is in contact with the metallic member 610 adjacent to the insulator 7a, in the rotational axis direction. The insulator 7a is provided with the external terminals 4 (see FIG. 2). That is, the protruding portion 31a is in contact with the metallic member 610 adjacent to the external terminals 4.

The protruding portion 31a is in contact with the metallic member 610 in the rotational axis direction, but without being limited. The protruding portion 31a may be in contact with the metallic member 610 in the radial direction being an X-axis direction. In that case, the protruding portion 31a may have a pressing mechanism that is in contact with the outer peripheral portion 6a of the metallic member 610 and that presses the metallic member 610 in the radial direction.

An example of the pressing mechanism is, for example, a mechanism pressing the metallic member 610 by fastening with a screw or the like penetrating through the frame 3 from outer peripheral portion of the frame 3 to the inner peripheral portion 31 of the frame 3.

Furthermore, the protruding portions 31a support the stator 6 by contacting the metallic member 610 of the stator 6, but without being limited. The protruding portions 31a may support the stator 6 by contacting the insulator 7a or another member.

Figure 9:
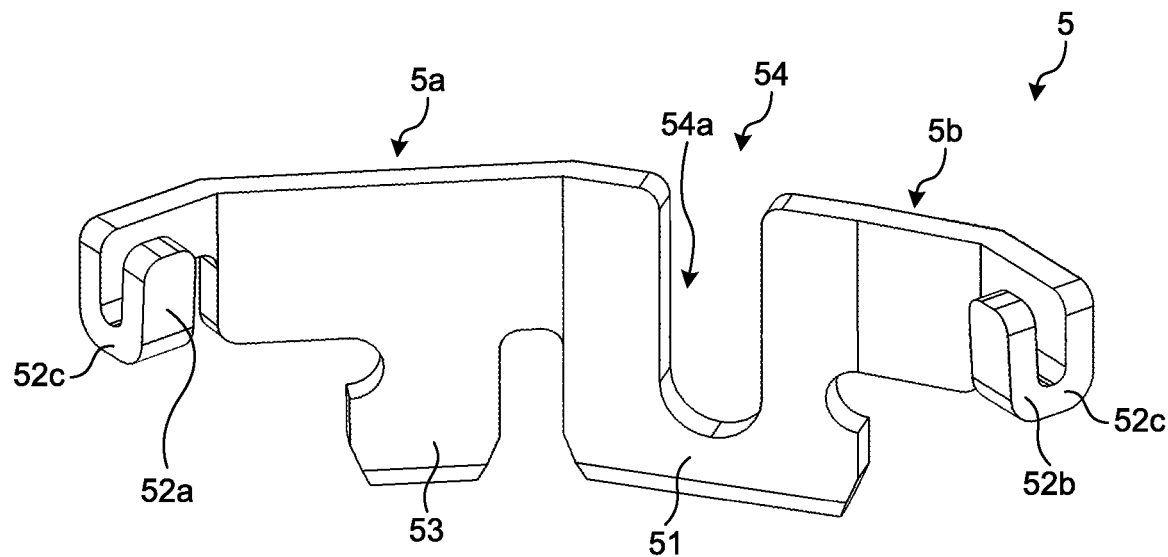
FIG. 9 is a perspective view of internal terminals according to the embodiment.
Figure 10:
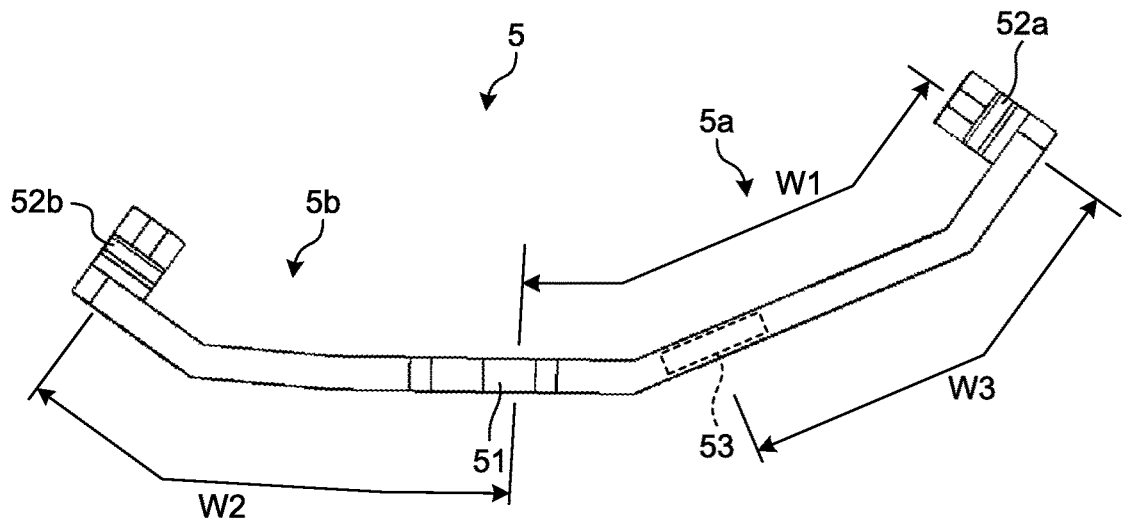
FIG. 10 is a bottom view of the internal terminals according to the embodiment.
Figure 11:
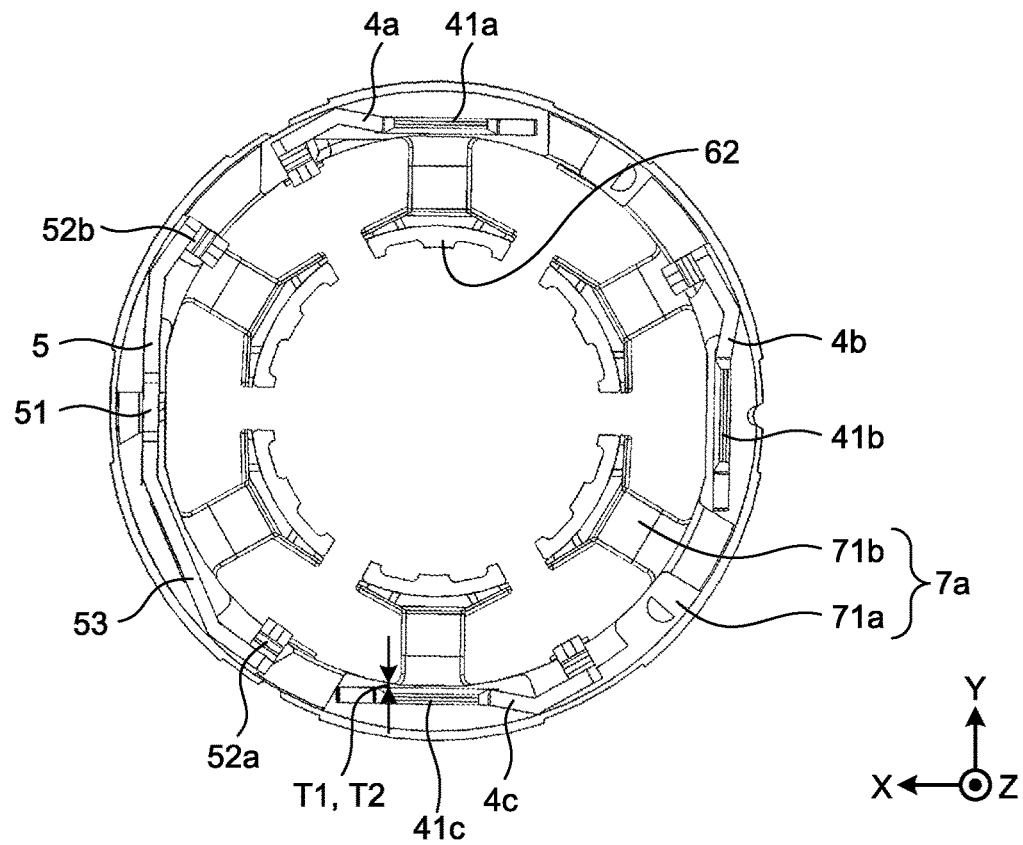
FIG. 11 is a top view of an insulator according to the embodiment.

Next, the internal terminals 5 will be described in detail by use of FIG. 9 to FIG. 11. FIG. 9 is a perspective view of the internal terminals 5 according to the embodiment. FIG. 10 is a bottom view of the internal terminals 5 according to the embodiment. FIG. 11 is a top view of the insulator 7a according to the embodiment.

As illustrated in FIG. 9, the internal terminals 5a and 5b are integrally formed of, for example, a member having electrical conductivity. "Being formed integrally" includes, for example, being formed of a plurality of electrically conductive members coupled together, or being formed of a single electrically conductive member.

As illustrated in FIG. 9, the internal terminals 5a and 5b include a fixed portion 51, a first connected portion 52a, a second connected portion 52b, and a supporting portion 53. Furthermore, the internal terminals 5 have a recessed portion 54 formed in an outer peripheral wall portion, in the rotational axis direction.

Specifically, the recessed portion 54 has a space 54a inside the recessed portion 54.

The fixed portion 51 is a part being fixed to the insulator 7a. More specifically, the fixed portion 51 is fixed by being inserted in a hole portion. The hole portion is provided in the insulator 7a and not illustrated in the drawings.

The lead wire is connected to the first connected portion 52a and the second connected portion 52b. Furthermore, each of the first connected portion 52a and the second connected portion 52b has a hook-shaped hook folded back to a side opposite to the fixed portion 51. More specifically, each of the hooks of the first connected portion 52a and second connected portion 52b has a bent portion 52c bent to an inner side of the stator 6 (see FIG. 3) in the radial direction.

The lead wire is entwined with the hooks of the first connected portion 52a and the second connected portion 52b, and is fixed by distal end portions of the hooks being welded through heat caulking. Furthermore, the insulating member covering the lead wire melts due to the heat caulking, and accordingly, a metallic part of the lead wire contacts metallic parts of the first connected portion 52a and second connected portion 52b. Accordingly, the lead wire electrically connects the coils 10 (see FIG. 3) and the terminals 45 to each other.

The supporting portion 53 is a portion being between the fixed portion 51 and the first connected portion 52a in the circumferential direction, and is a portion supporting the first connected portion 52a with respect to the stator 6 via the insulating member. More specifically, the supporting portion 53 is fixed by being inserted in a hole portion of the insulator 7a.

Furthermore, as illustrated in FIG. 10, in the internal terminals 5, a length W1 from the first connected portion 52a to the fixed portion 51 is longer than a length W2 from the second connected portion 52b to the fixed portion 51, in the circumferential direction. Furthermore, the length W3 from the supporting portion 53 to the first connected portion 52a is substantially the same as the length W2 from the fixed portion 51 to the second connected portion 52b. In FIG. 10, the lengths W1, W2, and W3 are each illustrated as a distance from a midpoint of the portion serving as the starting point (for example, the second connected portion 52b, the supporting portion 53, or the fixed portion 51) to a midpoint of the portion serving as the end point (for example, the fixed portion 51, the first connected portion 52a, or the second connected portion 52b).

Although the supporting portion 53 is provided between the fixed portion and the first connected portion 52a, without being limited. The supporting portion 53 may be provided between the fixed portion 51 and the second connected portion 52b. Or, a part formed of the supporting portion 53 and the fixed portion 51 coupled together may serve as both the supporting portion 53 and the fixed portion 51. Other examples of the supporting portion 53 will be described later by use of FIG. 12 and FIG. 13.

Described next by use of FIG. 11 is the arrangement of the internal terminals 5 and the external terminals 4. FIG. 11 is a top view of the insulator 7a according to the embodiment. As illustrated in FIG. 11, the insulator 7a has a first insulating portion 71a provided on the core 61 of the stator 6 (see FIG. 4) and has a tubular shape, and a second insulating portion 71b provided on the teeth 62.

As illustrated in FIG. 11, the external terminals 4 and the internal terminals 5 are provided at the first insulating portion 71a of the insulator 7a. Specifically, the internal terminals 5 are provided at one side of the first insulating portion 71a, the one side being in the X-axis positive direction, and the external terminals 4a to 4c are provided on the other side of the first insulating portion 71a, the other side being in an X-axis negative direction.

Furthermore, the external terminals 4a to 4c have fixed portions 41a to 41c being fixed to the insulator 7a. The fixed portions 41a and 41c of the two external terminals 4a and 4c facing each other in the radial direction, out of the external terminals 4a to 4c, face with their corresponding teeth 62 out of the teeth 62.

Furthermore, the fixed portion 41b in the external terminal 4b between the two external terminals 4a and 4c facing to each other is arranged between some of the teeth 62 in the radial direction. That is, the fixed portion 41b of the external terminal 4b is arranged between some of the coils 10 in the circumferential direction. In other words, the fixed portion 41b of the external terminal 4b is provided at the insulator 7a at a position different from those of the teeth 62 in the circumferential direction.

Furthermore, the fixed portion 51 of the internal terminals 5 facing with the external terminal 4b is arranged between some of the teeth 62 in the circumferential direction. In other words, the internal terminals 5 are fixed adjacently to the coils 10 in the circumferential direction. Furthermore, the supporting portion 53 of the internal terminals 5 faces with one of the some of the teeth 62.

Figure 12:
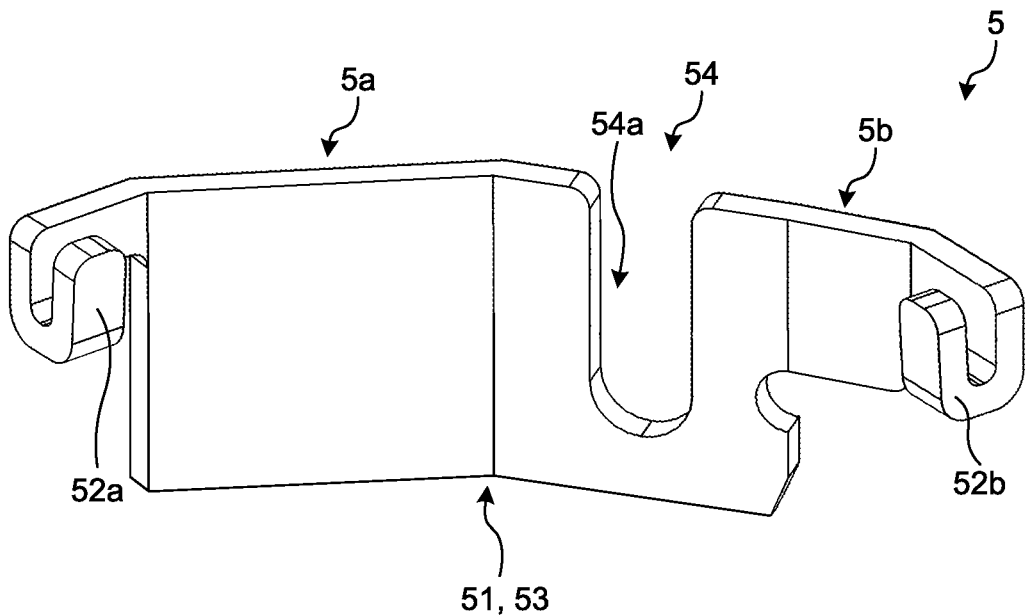
FIG. 12 is a perspective view of internal terminals according to a modified example.
Figure 13:
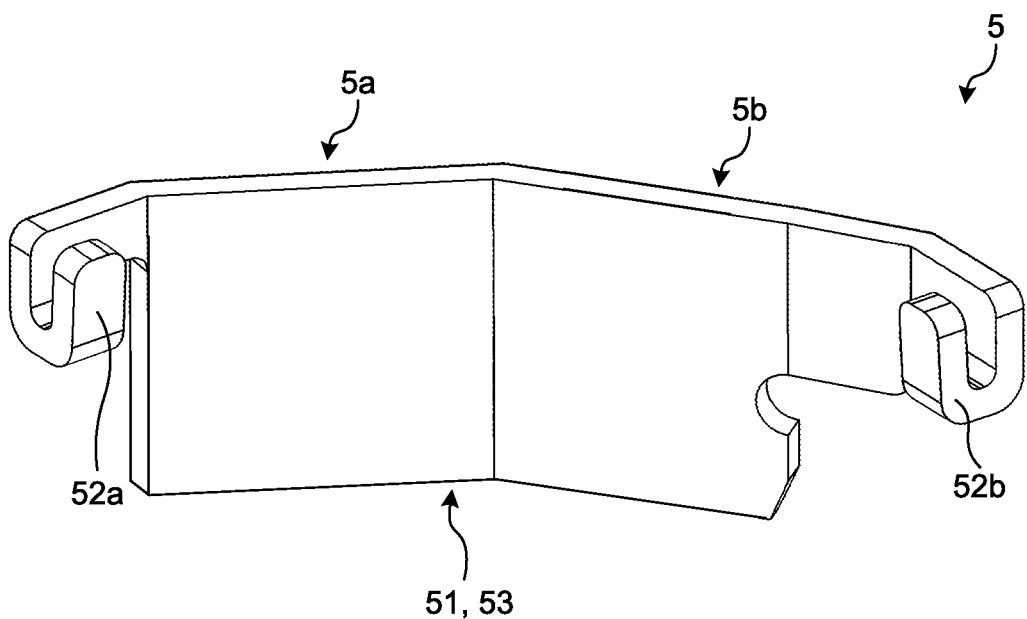
FIG. 13 is a perspective view of internal terminals according to a modified example.

Described next by use of FIG. 12 and FIG. 13 are other examples of the internal terminals 5. FIG. 12 and FIG. 13 are diagrams illustrating internal terminals 5 according to modified examples. As illustrated in FIG. 12, internal terminals 5 have a part where a part of the fixed portion 51 and the supporting portion 53 have been coupled together. Specifically, the supporting portion 53 has been coupled with a part of the fixed portion 51, the part being on the first connected portion 52a side of the recessed portion 54.

That is, a part of the fixed portion 51 has functions of both the fixed portion 51 and the supporting portion 53, the part being at the first connected portion 52a side across the recessed portion 54, and a part of the fixed portion 51 has the function of the fixed portion 51 alone, the part being at the second connected portion 52b side.

Furthermore, as illustrated in FIG. 13, internal terminals 5 may have a part where all of the fixed portion 51 and the supporting portion 53 have been integrated together. In this case, as illustrated in FIG. 13, the recessed portion 54 may be omitted, or provided in another part of the internal terminals 5.

In FIG. 9, FIG. 12, and FIG. 13, the internal terminals 5 have the supporting portion 53, but the supporting portion 53 may be omitted. Specifically, the internal terminals 5 may have, in the circumferential direction, the fixed portion 51 substantially at a midpoint between the first connected portion 52a and the second connected portion 52b. That is, the internal terminals 5 may have a shape where, in the circumferential direction, the length W1 (see FIG. 9) from the first connected portion 52a to the fixed portion 51 is substantially the same as the length W2 (see FIG. 9) from the second connected portion 52b to the fixed portion 51. One of the lengths W1 and W2 becoming extremely long is thereby able to be prevented and disconnection of the lead wire due to vibration is thus able to be prevented.

Furthermore, according to the above described configuration, a lead wire 100 is able to be prevented from being disconnected due to: vibration of the terminals 45 by vibration of the motor 1; comparative increase in vibration at the first connected portion 52a and second connected portion 52b; and change in the tension of the coils 10 in association with the vibration at the first connected portion 52a and second connected portion 52b.

Figure 14:
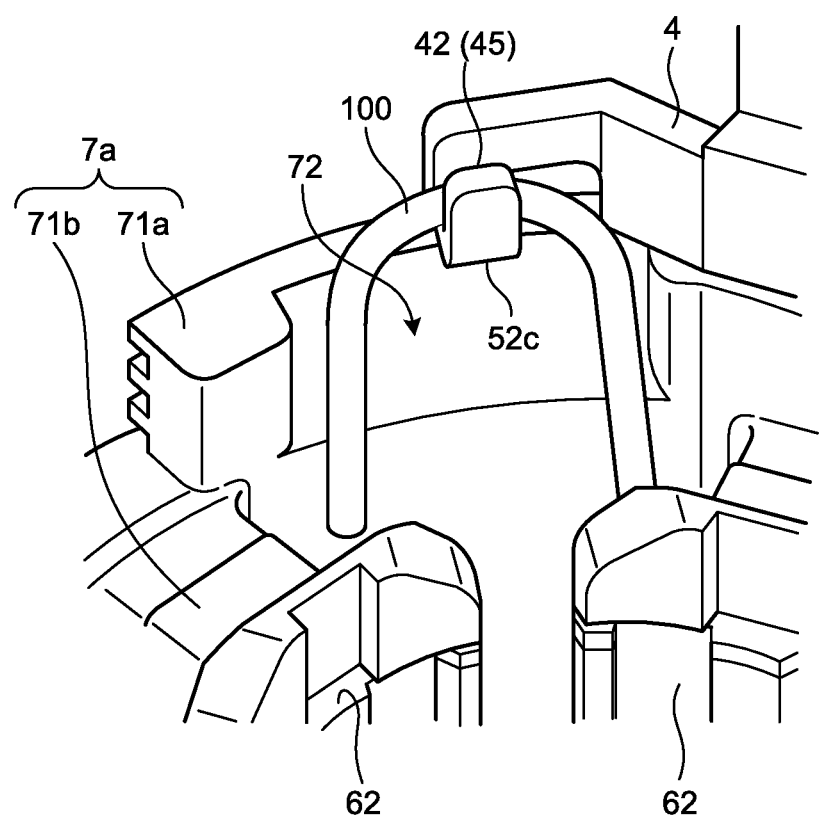
FIG. 14 is a perspective view of an insulator according to the embodiment.

Described next by use of FIG. 14 is the shape of the insulator 7a. FIG. 14 is a perspective view of the insulator 7a according to the embodiment. FIG. 14 illustrates a state where the lead wire 100 has been welded to a connected portion 42 of the external terminals 4.

As illustrated in FIG. 14, the first insulating portion 71a of the insulator 7a is provided with a recessed portion 72. Specifically, the recessed portion 72 is formed at the insulator 7a in a part of the first insulating portion 71a facing with the lead wire 100 in the radial direction.

Furthermore, the motor 1 has, in the radial direction, a space between the recessed portion 72 and the lead wire 100. That is, the insulator 7a and the lead wire 100 are separate from each other. Accordingly, the lead wire 100 is able to be prevented from being disconnected as a result of welding between the lead wire 100 and the first insulating portion 71a due to the heat in the welding at the connected portion 42.

Furthermore, as illustrated in FIG. 14, the recessed portion 72 is provided, in the circumferential direction, between some of the teeth 62. Moreover, the recessed portion 72 is provided between the teeth 62 and the connected portion 42 of the external terminals 4, in the rotational axis direction. In addition, the insulator 7a has a plurality of these recessed portions 72. This will be described by use of FIG. 15.

Figure 15:
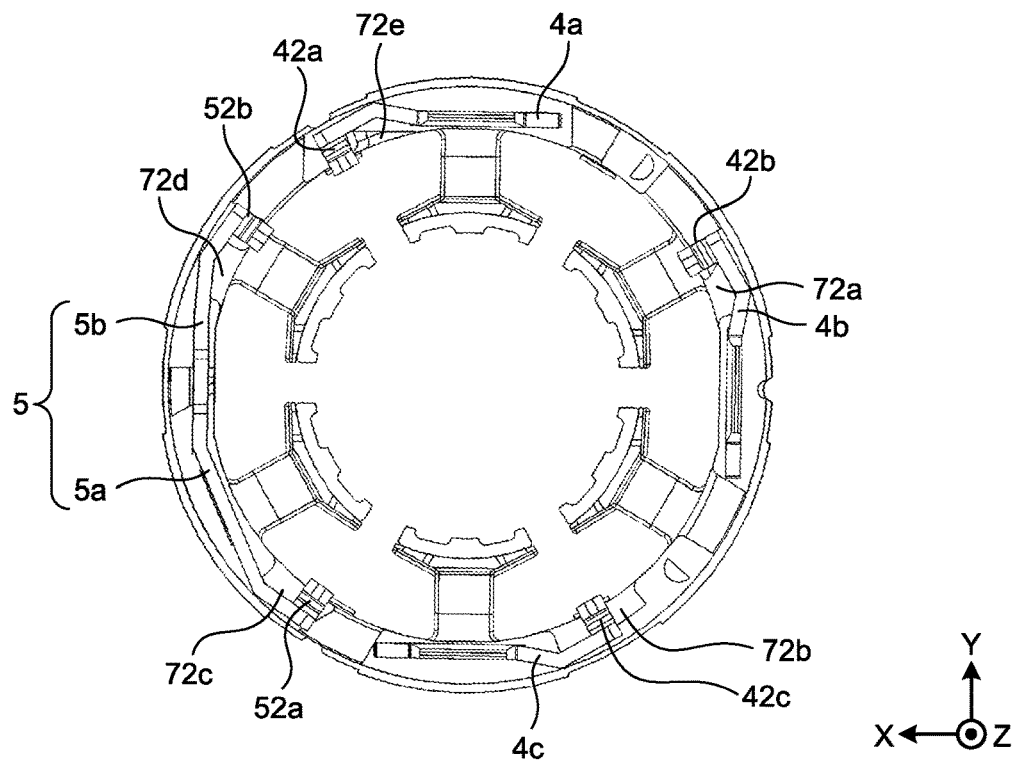
FIG. 15 is a top view of the insulator according to the embodiment.

FIG. 15 is a top view of the insulator 7a. As illustrated in FIG. 15, a a plurality of recessed portions 72a to 72e are provided, in the circumferential direction, at the first connected portion 52a and second connected portion 52b of the internal terminals 5a and 5b and at connected portions 42a to 42c of the external terminals 4a to 4c.

In FIG. 15, welding between the lead wire 100 and the first insulating portion 71a is prevented by formation of the recessed portions 72 in the first insulating portion 71a, but instead of the recessed portions 72, for example, protruding portions may be formed. This will be described by use of FIG. 16.

Figure 16:
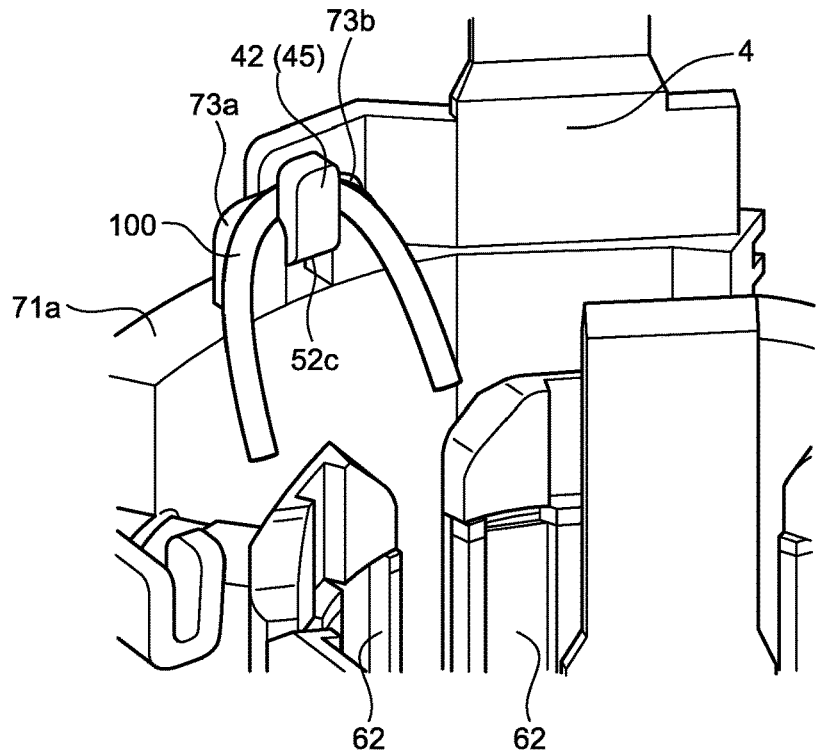
FIG. 16 is a perspective view of an insulator according to a modified example.

FIG. 16 is a perspective view of the insulator 7a according to a modified example. As illustrated in FIG. 16, the insulator 7a has protruding portions 73a and 73b protruding in the rotational axis direction. The protruding portion 73a and the protruding portion 73b are arranged with a predetermined space between the protruding portion 73a and the protruding portion 73b in the circumferential direction.

The connected portion 42 of the external terminals 4 is arranged between the protruding portions 73a and 73b in the circumferential direction. That is, the protruding portion 73a and the protruding portion 73b are arranged to sandwich the connected portion 42 of the external terminals 4 in the circumferential direction.

Furthermore, the protruding portions 73a and 73b cover a part of the connected portion 42 of the external terminals 4 and a part of the lead wire 100. Specifically, the protruding portions 73a and 73b cover a part of the connected portion 42, the part being at the insulator 7a side in the rotational axis direction. Moreover, the protruding portions 73a and 73b cover a part of the lead wire 100, the part being inside and at both end portions of the connected portion 42.

Furthermore, the protruding portions 73a and 73b are welded to the connected portion 42 of the external terminals 4. Specifically, the protruding portions 73a and 73b are welded by the heat in the heat caulking of the connected portion 42. That is, the protruding portions 73a and 73b are fixed to the connected portion 42, in contact with the connected portion 42.

Furthermore, as illustrated in FIG. 16, the protruding portions 73a and 73b are provided between some of the teeth 62 in the circumferential direction. The protruding portions 73a and 73b are provided for each of the terminals 45, similarly to the above described recessed portion 72 (see FIG. 15).

Figure 17:
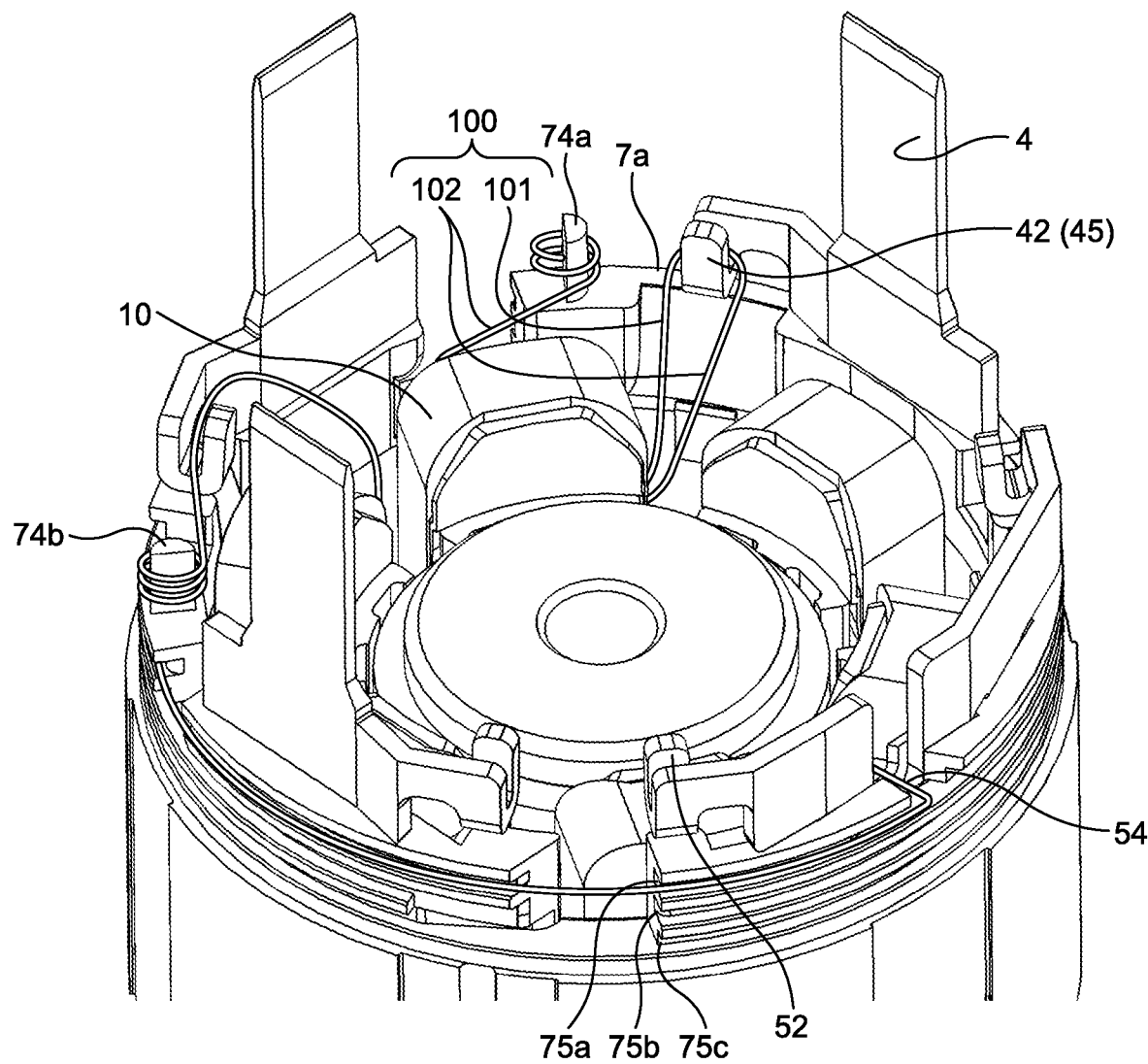
FIG. 17 is a diagram for explanation of a method of winding a lead wire according to the embodiment.

Described next by use of FIG. 17 is a method of winding the lead wire 100. FIG. 17 is a diagram for explanation of the method of winding the lead wire 100 according to the embodiment. As illustrated in FIG. 17, the insulator 7a has fixed portions 74a and 74b.

Specifically, the fixed portions 74a and 74b are parts protruding from the first insulating portion 71a in the rotational axis direction. Furthermore, the fixed portions 74a and 74b are each provided between the external terminals 4 in the circumferential direction.

End portions corresponding to a winding start point and a winding end point of the lead wire 100 in a case where the lead wire 100 is wired in a single stroke are respectively fixed to the fixed portion 74a and the fixed portion 74b. A method of wiring in a single stroke will be described later by reference to FIG. 18A and FIG. 18B.

Furthermore, as illustrated in FIG. 17, a a plurality of grooves 75a, 75b, and 75c are provided in an outer peripheral portion of the insulator 7a. The grooves 75a, 75b, and 75c have height positions different from one another in the rotational axis direction.

For example: the groove 75a is positioned, in the rotational axis direction, uppermost in the outer peripheral portion of the insulator 7a; the groove 75b is adjacent to a lower side of the groove 75a in the rotational axis direction, the lower side being in the Z-axis negative direction; and the groove 75c is adjacent to a lower side of the groove 75b in the rotational axis direction, the lower side being in the Z-axis negative direction.

Each of the grooves 75a, 75b, and 75c has the lead wire 100 wound around each of the grooves 75a, 75b, and 75c. Each of the grooves 75a, 75b, and 75c has the lead wire 100 wound around each of the grooves 75a, 75b, and 75c, along the outer peripheral portion by one round or by a half round or less.

That is, a part of the lead wire 100 does not come into contact with another part of the lead wire 100 in the grooves 75a, 75b, and 75c. In other words, a plurality of (three, in FIG. 15) winding positions of the lead wire 100 wound around the outer peripheral portion of the insulator 7a are different from one another in the rotational axis direction.

FIG. 17 illustrates the three grooves 75a, 75b, and 75c, but the number of grooves may be one or two, or even four or more. In other words, the number of grooves corresponds to the number of times that the lead wire is wound around the outer peripheral portion of the insulator 7a. Furthermore, the grooves 75a, 75b, and 75c may be not provided, as necessary.

Furthermore, as illustrated in FIG. 17, the lead wire 100 has a first portion 101 and a second portion 102. The first portion 101 and the second portion 102 are connected together via the connected portion 42 and extend in two different directions from the connected portion 42.

The first portion 101 extends toward the tooth 62 from the connected portion 42 of the external terminal 4. Furthermore, by being wound around the tooth 62 clockwise, the first portion 101 forms the coil 10. A wiring procedure for the first portion 101 after the formation of the coil 10 will be described later by reference to FIG. 18A and FIG. 18B.

Furthermore, the second portion 102 is laid to circumvent the first portion 101 forming the coil 10. Specifically, the second portion 102 extends from the fixed portion 74a to the tooth 62, and is wound around the tooth 62 counterclockwise by about a half round. That is, the laying direction for the second portion 102 (counterclockwise) is opposite to the winding direction of the first portion 101 (clockwise) forming the coil 10.

Furthermore, the second portion 102 extends to the connected portion 42 after being laid around the tooth 62. Moreover, between the connected portion 42 and the tooth 62, the first portion 101 is on the coil 10 side of the second portion 102. That is, the first portion 101 is arranged at a position nearer to the coil 10 than the second portion 102 is.

Specifically, the first portion 101 is on the coil 10 side of the connected portion 42 (the hook), and the second portion 102 is on the opposite side of the connected portion 42 in relation to the first portion 101.

Furthermore, the first portion 101 and the second portion 102 are separate from each other in the circumferential direction. That is, between the connected portion 42 and the tooth 62, the first portion 101 and the second portion 102 are arranged with an space between each other.

Furthermore, the second portion 102 is in contact with the coil 10 at the tooth 62. That is, the second portion 102 contacts the first portion 101 forming the coil 10. The first portion 101 and the second portion 102 do not necessarily contact each other at the tooth 62, as long as the second portion 102 is laid to circumvent. Moreover, the second portion 102 may be laid to circumvent another member other than the tooth 62.

Furthermore, FIG. 17 illustrates the case where the second portion 102 has been left there, but the second portion 102 may be removed after the coil 10 has been formed.

Figure 18A:
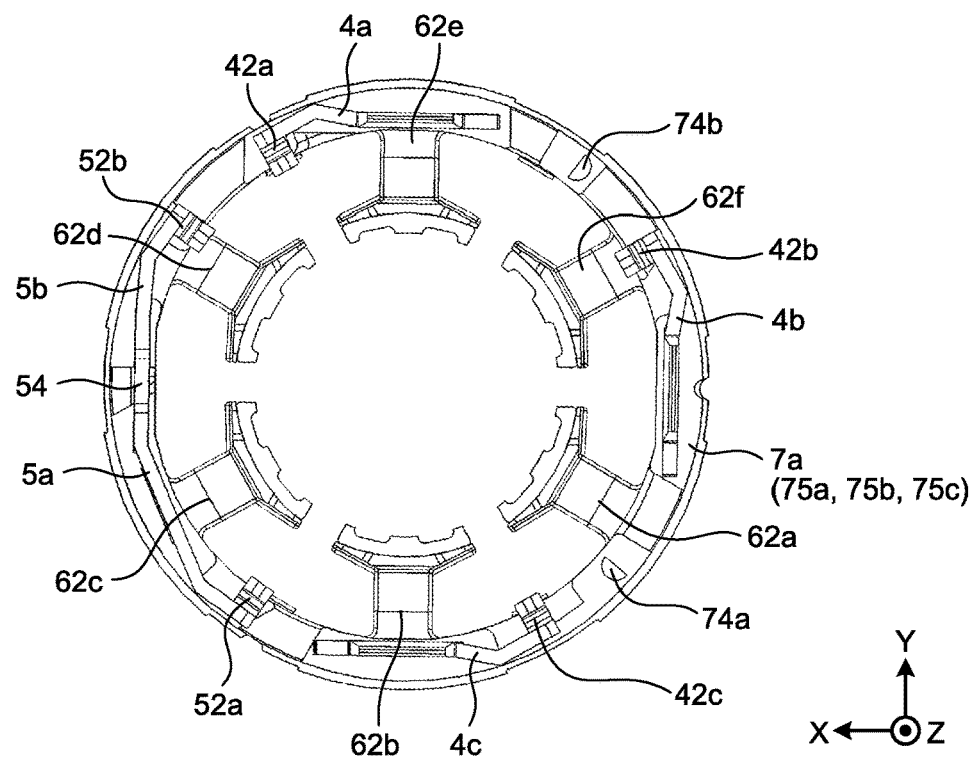
FIG. 18A is a diagram for explanation of wiring of the lead wire according to the embodiment.
Figure 18B:
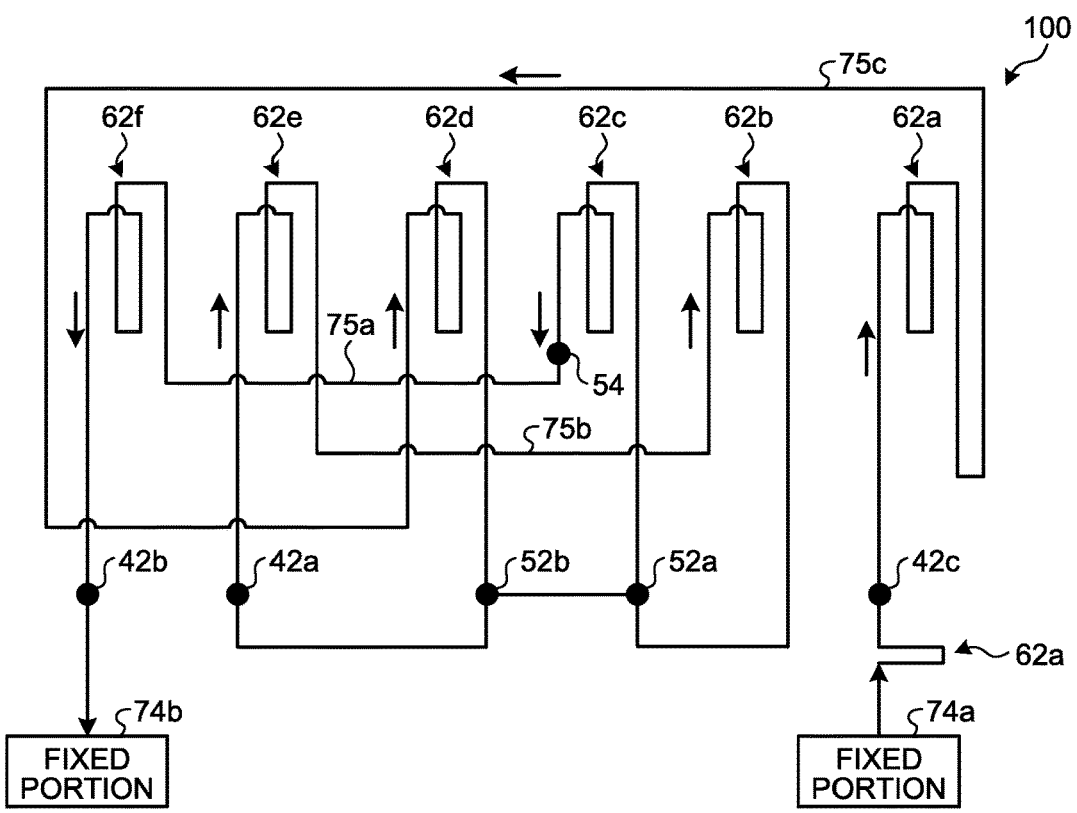
FIG. 18B is a diagram for explanation of the wiring of the lead wire according to the embodiment.

Described next by use of FIG. 18A and FIG. 18B is wiring of the lead wire 100. FIG. 18A and FIG. 18B are diagrams for explanation of the wiring of the lead wire 100 according to the embodiment. FIG. 18A is a top view of parts including the insulator 7a, and FIG. 18B is a wiring diagram. In FIG. 18A, portions that the lead wire 100 passes through in the wiring diagram of FIG. 18B are assigned with their reference signs, and portions in FIG. 18B corresponding to these portions will be assigned with the same reference signs.

That is, as illustrated in FIG. 18A, the lead wire 100 passes through the teeth 62a to 62f; the first connected portion 52a and second connected portion 52b of the internal terminals 5a and 5b, the connected portions 42a, 42b, and 42c of the external terminals 4a, 4b, and 4c, the grooves 75a, 75b, and 75c of the insulator 7a, and the fixed portions 74a and 74b.

Accordingly a W-phase magnetic circuit is formed by the coils 10 wound around the facing two teeth 62a and 62d, a U-phase magnetic circuit is formed by the coils 10 wound around the facing two teeth 62b and 62e, and a V-phase magnetic circuit is formed by the coils 10 wound around the facing two teeth 62c and 62f.

Described next by use of FIG. 18B is a wiring procedure for the lead wire 100. As illustrated in FIG. 18B, an end portion of the lead wire 100, the end portion being at the winding start point, is fixed to the fixed portion 74a, and is laid around the tooth 62a adjacent to the fixed portion 74a in the circumferential direction, by a half round or one round counterclockwise by circumventing.

Subsequently, the lead wire 100 is entwined with the connected portion 42c of the external terminal 4c counterclockwise in the circumferential direction, and after coming out from the connected portion 42c, the lead wire 100 forms the coil 10 by being wound around the tooth 62a by a plurality rounds clockwise.

Subsequently, after being wound around the tooth 62a, the lead wire 100 gets over to the outer peripheral portion of the insulator 7a, and is wound around the lowermost groove 75c, up to the position of the tooth 62d counterclockwise in the circumferential direction.

Subsequently, the lead wire 100 gets over from the outer peripheral portion to an inner peripheral portion of the insulator 7a, forms the coil 10 by being wound around the tooth 62d clockwise more than once, and is entwined with the second connected portion 52b of the internal terminals 5b clockwise in the circumferential direction.

Subsequently, after coming out from the second connected portion 52b, the lead wire 100 is entwined clockwise with the connected portion 42a of the external terminal 4a adjacent to the second connected portion 52b in the circumferential direction, and forms the coil 10 by being wound around the tooth 62e clockwise by a plurality of rounds.

Subsequently, after being wound around the tooth 62e, the lead wire 100 gets over from the inner peripheral portion to the outer peripheral portion of the insulator 7a, and is wound around the middle groove 75b, up to the position of the tooth 62b counterclockwise in the circumferential direction.

Subsequently, the lead wire 100 gets over from the outer peripheral portion to the inner peripheral portion of the insulator 7a, forms the coil 10 by being wound around the tooth 62b clockwise by a plurality of rounds, and is entwined with the first connected portion 52a of the internal terminal 5a clockwise in the circumferential direction.

Subsequently, after coming out from the first connected portion 52a, the lead wire 100 forms the coil 10 by being wound around the tooth 62c adjacent to the first connected portion 52a, counterclockwise by a plurality of rounds. Subsequently, the lead wire 100 passes through the recessed portion 54 of the internal terminals 5a and 5b, gets over from the inner peripheral portion to the outer peripheral portion of the insulator 7a, and is wound around the uppermost groove 75a clockwise in the circumferential direction, up to the position of the tooth 62f.

Subsequently, the lead wire 100 gets over from the outer peripheral portion to the inner peripheral portion of the insulator 7a, forms the coil 10 by being wound around the tooth 62f counterclockwise by a plurality of rounds, and is entwined with the connected portion 42b of the external terminal 4b counterclockwise in the circumferential direction.

Subsequently, after coming out from the connected portion 42b, the lead wire 100 is fixed to the fixed portion 74b, and the wiring is ended. That is, according to the above described wiring procedure, the lead wire 100 is wound in a single stroke. In other words, the single lead wire 100 forms the coils 10, and is wound around the inner peripheral portion and outer peripheral portion of the insulator 7a.

According to the above described embodiment, the insulators 7a and 7b cover the end portion faces 6c and 6d and the inner peripheral portion 6b of the stator 6 (see FIG. 2), but without being limited. An insulating film may be provided, instead of the insulators 7a and 7b, on the inner peripheral portion 6b of the stator 6. This will be described by use of FIG. 19 to FIG. 21.

Figure 19:
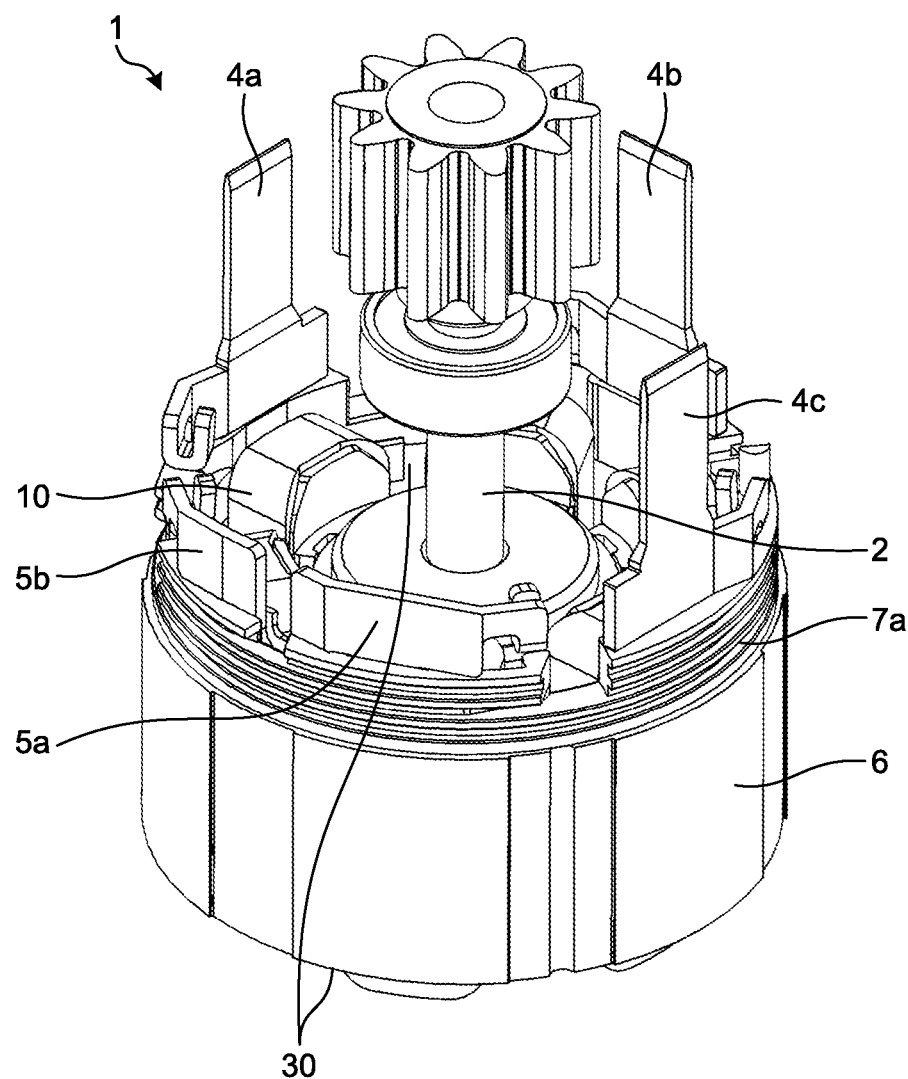
FIG. 19 is a perspective view of a motor according to a modified example.
Figure 20:
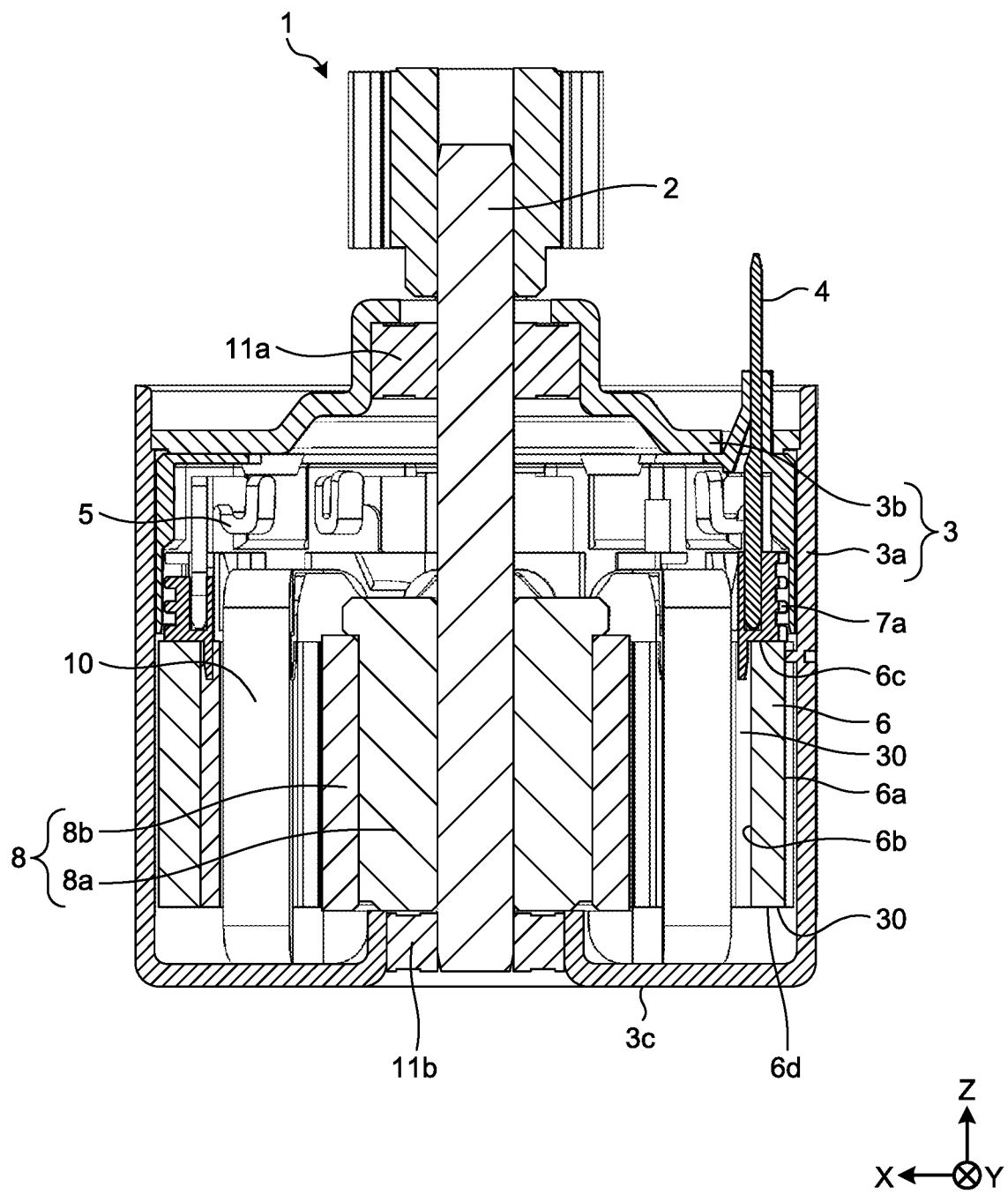
FIG. 20 is a sectional view of the motor according to the modified example.

FIG. 19 is a perspective view of a motor 1 according to a modified example. FIG. 20 is a sectional view of the motor 1 according to the modified example. The modified example is different from the above described embodiment in that a part of the stator 6 is covered with an insulating film instead of an insulator 7.

As illustrated in FIG. 19 and FIG. 20, in the motor 1, the one end face 6c out of the two end faces 6c and 6d facing with the coils 10 in the stator 6, the end face 6c being at the external terminal 4 side, is covered with the insulator 7a.

Furthermore, an adhesive member not illustrated in the drawings is provided between the insulator 7a and the end face 6c of the stator 6. Accordingly, the adhesive member fixes the insulator 7a and the coils 10 to each other. The other end face 6d and the inner peripheral portion 6b are provided with an insulating film 30.

The insulating film 30 is formed by, for example, powder coating, with an insulating resin member or the like. Similarly to the above described embodiment, the end portion face 6d may be provided with the insulator 7b, instead of the insulating film 30.

Figure 21:
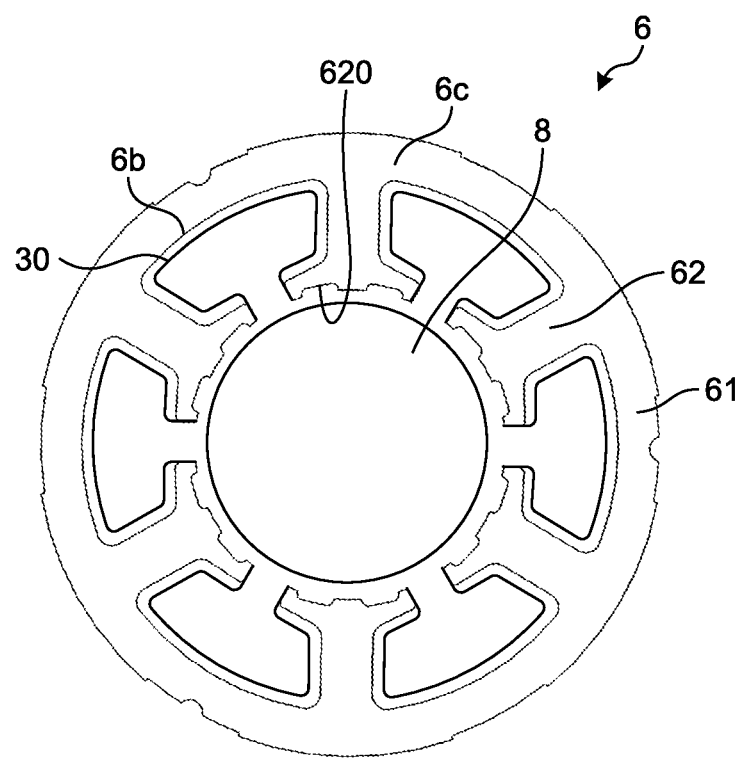
FIG. 21 is a top view of a stator according to the modified example.

Described further next by use of FIG. 21 is the insulating film 30. FIG. 21 is a top view of the stator 6 according to the modified example. As illustrated in FIG. 21, the insulating film 30 is provided on side surfaces (the inner peripheral portion 6b) out of the teeth 62, the side surfaces being other than side surfaces 620 opposite to the rotor 8.

Specifically, the insulating film 30 covers the inner peripheral portion 6b. The inner peripheral portion 6b is the side surfaces between the two opposite end faces 6c and 6d of the stator 6, in the rotational axis direction. More specifically, the insulating film 30 covers side surfaces of the core 61, the side surfaces facing with the rotor 8, and side surfaces (excluding the side surfaces 620) of the teeth 62.

Furthermore, the insulator 7a (not illustrated in FIG. 21) covers an end face of the core 61 of the stator 6, and a part of end faces of the teeth 62. Specifically, the insulator 7a covers a part of the end faces of the teeth 62, the part being other than end portions at the rotor 8 side in the radial direction.

As described above, the motor 1 according to the embodiment includes the stator 6, an insulating member (insulators 7), and the terminals 45. The stator 6 has the lead wire 100. The insulating member is provided on the stator 6. The terminals 45 are provided on the insulating member. Furthermore, the terminals 45 include the fixed portions 41a to 41c and 51 fixed to the insulating member, and one or a plurality of connected portions 42 and 52. The lead wire 100 is connected to the connected portions 42 and 52. Moreover, the terminals 45 have, in a part between the fixed portions 41a to 41c and 51 and the connected portions 42 and 52 in the circumferential direction, the supporting portion 53 supporting the terminals 45 with respect to the stator 6. Accordingly, since vibration of the terminals 45 is able to be reduced, the lead wire 100 connected to the connected portions 42 and 52 is able to be prevented from being disconnected.

Furthermore, in the motor 1 according to the embodiment, the terminals 45 include the connected portions 42 and 52, and the length W1 from the first connected portion 52a out of the connected portions 42 and 52 to the fixed portion 51 is longer than the length W2 from the second connected portion 52b out of the connected portions 42 and 52 to the fixed portion 51, in the circumferential direction. Moreover, the supporting portion 53 is provided in a part between the first connected portion 52a and the fixed portion 51. Accordingly, the lead wire 100 connected to the first connected portion 52a of the internal terminals 5 is able to be prevented from being disconnected.

Furthermore, in the motor 1 according to the embodiment, the length W3 from the supporting portion 53 to the first connected portion 52a is substantially the same as the length W2 from the fixed portion 51 to the second connected portion 52b. Accordingly, vibration of the first connected portion 52a is able to be reduced substantially to the same degree as vibration of the second connected portion 52b.

Furthermore, in the motor 1 according to the embodiment, the stator 6 has the teeth 62 arranged in the circumferential direction. The fixed portion 51 is provided between the teeth 62 in the radial direction. Accordingly, a thickness T1 of the core 61 having a side surface provided with the teeth 62 is able to be reduced in the radial direction, and the number of turns in the coil 10 is thus able to be increased by increase in length of the teeth 62. Furthermore, a thickness T2 of the insulating member covering the side surface of the core 61 provided with the teeth 62 is able to be reduced in the radial direction. Accordingly, the number of turns in the coil 10 is able to be increased.

Furthermore, in the motor 1 according to the embodiment, the supporting portion 53 faces with one of the teeth 62 in the radial direction. Accordingly, the supporting portion 53 is stabilized, and influence of vibration is thus able to be kept to a bare minimum. Moreover, in the radial direction, by arrangement of the supporting portion 53 at a position different from the position of the tooth 62 where the coil 10 has been wound around, the thickness T2 of the insulating member covering the side surface of the core 61 provided with the teeth 62 is able to be reduced. Accordingly, the number of turns in the coil 10 is able to be increased.

Furthermore, the motor 1 according to the embodiment includes the magnetic body, the insulating member (the insulators 7), the terminals 45, the coils 10, and the lead wire 100. The insulating member (the insulators 7) covers the magnetic body. The terminals 45 are provided on the insulating member. The coils 10 surround the magnetic member. The lead wire 100 electrically connects the coils 10 and the terminals 45 to each other. Moreover, the lead wire 100 is welded to the terminals 45, and a part of the insulating member has the recessed portion 72, the part facing with the lead wire 100, in the radial direction. Accordingly, the lead wire 100 and the insulator 7a are able to be prevented from adhering to each other due to the insulator 7a being melted by heat transmitted to the coils 10 when the terminals 45 and the lead wire 100 are welded together by heat caulking. In addition, the prevention of adhesion enables prevention of disconnection as stress associated with vibration will not act on the lead wire 100.

Furthermore, the motor 1 according to the embodiment has a space between the recessed portion 72 and the lead wire 100. The lead wire 100 and the insulator 7a are able to be infallibly prevented from adhering to each other.

Furthermore, the motor 1 according to the embodiment includes the stator 6. The stator 6 is annular or tubular, and has the magnetic body. The magnetic body includes the tubular core 61 and the teeth 62 extending in the radial direction. The teeth 62 are arranged in the circumferential direction with respect to the core 61. The insulating member covers a part of the end faces 6c and 6d and a part of the inner peripheral portion 6b of the stator 6. The terminals 45 are provided oppositely to the stator 6 with respect to the insulating member, and are provided on a part of the insulator 7a, the part being at the end face 6c side of the stator. Moreover, the lead wire 100 forming the coils 10 is wound around the teeth 62 via the insulating member. Accordingly, the coils 10 and the insulator 7a are able to be prevented from adhering to each other.

Furthermore, in the motor 1 according to the embodiment, the recessed portion 72 is provided between some of the teeth 62 in the circumferential direction. Accordingly, the lead wire 100 between the teeth 62 and the terminals 45 is able to be prevented from adhering to the insulator 7a, and as a result, disconnection of the lead wire 100 is able to be prevented.

Furthermore, in the motor 1 according to the embodiment, the recessed portions 72 are provided between the teeth 62 and the terminals 45, in the rotational axis direction. Accordingly, adhesion between the teeth 62 and the terminals 45 in the rotational axis direction is able to be prevented.

Furthermore, in the motor 1 according to the embodiment, the insulating member has the first insulating portion 71a provided on the core 61 of the stator 6 and has a tubular shape, and the second insulating portion 71b provided at the teeth 62. Furthermore, the terminals 45 are provided on the first insulating portion 71a. Accordingly, the lead wire 100 is able to be prevented from adhering to the first insulating portion 71a.

Furthermore, if the lead wire 100 adheres to the first insulating portion 71a, the length of the lead wire 100 is decreased (shortened), tension becomes easier to act on the lead wire 100 in association with vibration of the motor 1, and the lead wire 100 may be disconnected. However, by prevention of adhesion, sufficient length of the lead wire 100 is able to be obtained, effects of tension acting on the lead wire 100 are able to be reduced, and disconnection is able to be prevented.

Furthermore, in the motor 1 according to the embodiment, the terminals 45 extend in the rotational axis direction, and the bent portion 52c bent to the inner side of the stator 6 in the radial direction is provided in the terminals 45. Moreover, the lead wire 100 is welded to the bent portion 52c. Accordingly, since the lead wire 100 is fixed inside the stator 6 in the radial direction, the lead wire 100 is able to be infallibly prevented from adhering to the insulator 7a.

Furthermore, in the motor 1 according to a modified example of the embodiment, the insulating member includes the protruding portions 73a and 73b protruding in the rotational axis direction. The protruding portions 73a and 73b cover a part of the terminals 45 and a part of the lead wire 100. Accordingly, the lead wire 100 and the insulator 7a other than the protruding portions 73a and 73b are able to be prevented from adhering to each other due to the insulator 7a being melted by heat transmitted to the coils 10 via the lead wire 100 upon welding by heat caulking between the terminals 45 and the lead wire 100. Moreover, the prevention of adhesion enables prevention of disconnection as stress due to vibration is able to be prevented from acting on the lead wire 100.

Furthermore, in the motor 1 according to the modified example of the embodiment, the protruding portions 73a and 73b are welded to the terminals 45. Accordingly, the protruding portions 73a and 73b are welded near the terminals 45, and stress on the lead wire 100 due to vibration is thus able to be reduced.

Furthermore, the motor 1 according to the modified example of the embodiment includes the pair of protruding portions 73a and 73b, and the terminal 45 is provided between the pair of protruding portions 73a and 73b in the circumferential direction. Accordingly, the terminal 45 is able to be sandwiched between the protruding portion 73a and the protruding portion 73b, and thus the welded lead wire 100 is able to be prevented from being removed.

Furthermore, in the motor 1 according to the modified example of the embodiment, the protruding portions 73a and 73b are provided between some of the teeth 62 in the circumferential direction. Accordingly, the lead wire 100 between the teeth 62 and the terminal 45 is able to be prevented from adhering to the insulator 7a, and as a result, disconnection of the lead wire 100 is able to be prevented.

Furthermore, the motor 1 according to the embodiment includes the coils 10, the terminals 45, and the lead wire 100. The terminals 45 are adjacent to the coils 10 in the circumferential direction. The lead wire 100 is electrically connected to the terminals 45. Moreover, the lead wire 100 has the first portion 101 and the second portion 102, and the first portion 101 and the second portion 102 extend in two different directions from the terminal 45. The first portion 101 forms the coil 10. The second portion 102 is laid to circumvent the first portion 101 forming the coil 10. The first portion 101 is on the coil 10 side of the second portion 102. Accordingly, since stress acting on the lead wire 100 in association with vibration of the motor 1 is able to be reduced, disconnection of the lead wire 100 is able to be prevented. In addition, since the angle by which the lead wire 100 has been bent near the connected portion 42 (an obtuse angle in the example illustrated), is able to be greater, effects of stress on the bent part of the lead wire 100 are able to be reduced, the stress being associated with vibration. What is more, since stress acting on a part of the lead wire 100 from the connected portion 42 is able to be reduced, the part contacting the connected portion 42 in association with vibration of the motor 1, disconnection of the lead wire 100 is able to be prevented.

Furthermore, the lead wire 100 is sometimes bent at an acute angle at the location where the terminal 45 is connected for the coil 10 and the terminal 45 to be connected to each other with the lead wire, due to the displacement between the coil 10 and the terminal 45 in the circumferential direction. Since the lead wire 100 is connected to the terminal 45 and the coil 10, the lead wire 100 is in a state where tension is able to act on the lead wire 100, and when the motor 1 vibrates in this state, stress acts on the bent part of the lead wire 100 and the lead wire 100 may be disconnected. However, according to the above described configuration, disconnection of the lead wire 100 is able to be prevented.

Furthermore, the motor 1 according to the embodiment has a plurality of the coils 10. The terminals 45 are arranged between the coils 10 in the circumferential direction. Accordingly, the lead wire 100 is able to be prevented from being disconnected between the coils 10.

Furthermore, the motor 1 according to the embodiment includes the stator 6 and the insulating member (the insulators 7). The stator 6 has the tubular core 61 and the teeth arranged in the circumferential direction. The insulating member is provided on the stator 6. The terminals 45 are provided on the insulating member at a position different from those of the teeth 62 in the circumferential direction. The insulating member is provided with the fixed portions 74a and 74b, and the parts of the lead wire 100 are fixed to the fixed portions 74a and 74b. The first portion 101 extends toward the tooth 62 from the terminal 45. The second portion 102 extends toward the fixed portions 74a and 74b from the tooth 62. Accordingly, the lead wire 100 is able to be prevented from being disconnected at the winding start portion of the lead wire 100.

Furthermore, in the motor 1 according to the embodiment, the terminals 45 have the hooks, and the lead wire 100 is connected to the hooks. The first portion 101 is on the coil 10 side of the hook. The second portion 102 is on the opposite side of the hook with respect to the first portion 101. Accordingly, the lead wire 100 is able to be prevented from coming off from the terminals 45.

Furthermore, in the motor 1 according to the embodiment, the first portion 101 of the lead wire 100 and the second portion 102 of the lead wire 100 are separate from each other in the circumferential direction. Accordingly, the first portion 101 and second portion 102 contacting each other are able to be prevented from being disconnected by friction or the like due to vibration. Moreover, both the first portion 101 of the lead wire 100 and the second portion 102 of the lead wire 100 extend toward the coil 10 from the terminal 45, and do not include a portion where the first portion 101 and the second portion 102 intersect each other. If the first portion 101 and second portion 102 intersecting each other are separated from each other or in contact with each other, the first portion 101 and the second portion 102 may contact each other due to vibration and disconnection may occur due to friction or the like caused by the contact. However, by being separate from each other in the circumferential direction, and both extending toward the common coil 10 from the common terminal 45, the first portion 101 and the second portion 102 are laid so as to not include a portion where the first portion 101 and the second portion 102 intersect each other, and thus disconnection due to friction or the like is able to be prevented. The second portion 102 contacts an end portion of the coil 10, the end portion facing with the bottom portion 3c of the frame 3.

Furthermore, in the motor 1 according to the embodiment, the insulating member includes a portion facing with the first portion 101 and the second portion 102, and the portion of the insulating member is the recessed portion 72, and the motor 1 has a space between: the recessed portion 72; and the first portion 101 and second portion 102. Accordingly, the first portion 101 and the second portion 102 are able to be prevented from adhering to the insulator 7a, and thus the lead wire 100 is able to be prevented from being disconnected.

Furthermore, in the motor 1 according to the embodiment, the second portion 102 is in contact with the coil 10. Accordingly, the second portion 102 is wound around the tooth 62, and a percentage of the second portion 102 in the lead wire 100 is able to be kept to a bare minimum, and the cost is thus able to be prevented from being increased.

Furthermore, in the motor 1 according to the embodiment, the direction in which the second portion 102 is laid is opposite to the winding direction of the first portion 101 forming the coil 10. Accordingly, the first portion 101 and the second portion 102 are able to be prevented from being intermingled with each other on the tooth 62.

Furthermore, in the motor 1 according to the embodiment, the second portion 102 includes an end portion of the lead wire 100, and the end portion is fixed to the fixed portions 74a and 74b. The lead wire 100 is thereby able to be wound around the tooth 62 via the insulating member with the winding start point of the lead wire 100 being fixed, and a coil 10 high in occupancy with less loosening is thus able to be formed.

Furthermore, the motor 1 according to the embodiment includes the rotating shaft 2, the stator 6, the frame 3, and the external terminals 4. The stator 6 has the outer peripheral portion 6a. The frame 3 has the inner peripheral portion 31 surrounding the stator 6. The external terminals 4 extend in the rotational axis direction. Moreover, the external terminals 4 are provided on the stator 6. In the stator 6, a part of the outer peripheral portion 6a, the part being at the external terminal 4 side in the rotational axis direction, is supported by a part of the inner peripheral portion 31 of the frame 3. Accordingly, even if the thickness of the metallic members forming the stator 6 has error, the protruding length of the external terminals 4 is able to be made a desired length.

Furthermore, if positioning between heights of the rotor 8 and stator 6 is performed by contact with the bottom surface at the other end side of the frame 3, the protruding length of the external terminals 4 may be unable to be set accurately. Specifically, due to a tolerance of the metallic members forming the stator 6, the height position of the stator 6 may be displaced, and as a result, the protruding length of the external terminals 4 may vary. However, according to the above described configuration, the protruding length of the external terminals 4 is able to be set to a desired length.

Furthermore, in the motor 1 according to the embodiment, a part of the inner peripheral portion 31 of the frame 3 is the protruding portions 31a protruding toward the outer peripheral portion 6a of the stator 6 in the radial direction. Accordingly, the stator 6 is able to be infallibly fixed in the rotational axis direction.

Furthermore, in the motor 1 according to the embodiment, the stator 6 includes a plurality of metallic members stacked in the rotational axis direction. These metallic members are each formed of a magnetic body, such as an electromagnetic steel plate. The external terminals 4 are provided on the metallic members via another member. The protruding portions 31a contact one of the metallic members, the one being adjacent to the external terminals 4. Accordingly, even if the thickness of the metallic members has error, the protruding length of the external terminals 4 is able to be set accurately.

Furthermore, in the motor 1 according to the embodiment, the stator 6 is provided with the recessed portions 63 in the outer peripheral portion 6a of the other metallic members out of the metallic members, the other metallic members being different from the metallic member adjacent to the external terminals 4. The recessed portions 63 face with the protruding portions 31a in the radial direction. Accordingly, the recessed portions 63 serve as a guide when the stator 6 is inserted in the frame 3, and the manufacturing operation is thus able to be facilitated.

Furthermore, in the motor 1 according to the embodiment, the protruding portions 31a are inside the recessed portions 63 in the radial direction. Accordingly, the protruding portions 31a are caught in the recessed portions 63, and positional displacement in the circumferential direction or rotational axis direction is thus able to be prevented.

Furthermore, in the motor 1 according to the embodiment, the external terminals 4 protrude from the frame 3 in the rotational axis direction. Accordingly, the length by which the external terminals 4 protrude from the frame 3 is able to be maintained accurately.

Furthermore, the motor 1 according to the embodiment includes the stator 6, and the terminals 45. The stator 6 has a tubular shape. The terminals 45 are provided on the stator 6, and are arranged plurally in the circumferential direction. The terminals 45 are integrally formed of a member having electrical conductivity. the recessed portion 54 is formed at the outer peripheral wall portion of the member having electrical conductivity has in the rotational axis direction. The lead wire 100 is wound around the inner peripheral portion 6b and outer peripheral portion 6a of the stator 6 by passing through the recessed portion 54. Accordingly, the number of parts is able to be reduced and the internal terminals do not need to be electrically connected to one another by use of a circuit board or the like, and thus the motor 1 is able to be configured with a simple circuit configuration.

Furthermore, in the motor 1 having the terminals 45 provided on the stator 6, if the terminals 45 are arranged separately from one another by use of independent separate members, an additional circuit board for electric connection among the terminals 45 is needed and the circuit configuration may become complicated. According to the above description, the motor 1 is able to be formed with a simple circuit configuration.

Furthermore, according to the embodiment, the insulating member (insulator 7) is provided in the motor 1 in the rotational axis direction, the insulating member (insulator 7) in a part of the recessed portion 54 corresponding to the lead wire 100. Accordingly, even if an insulating coating on the lead wire 100 is peeled off due to friction with the recessed portion 54, accidental electrical conduction to the internal terminals 5 is able to be prevented.

Furthermore, in the motor 1 according to the embodiment, the terminals 45 include the internal terminals 5 and the external terminals 4 provided on the end face 6c being a side surface of the stator 6 in the rotational axis direction. These internal terminals 5 and external terminals 4 extend in the rotational axis direction. In the circumferential direction, the internal terminals 5 are provided at one side of the end face 6c of the stator 6, and the external terminals 4 are provided at the other side of the end face 6c of the stator 6. Accordingly, the lead wire 100 is able to be wound efficiently. The end face in the rotational axis direction referred to herein is not a surface positioned at the extreme end in the rotational axis direction, and means a surface at an end portion side of the rotating shaft 2 and facing with the lid portion 3b of the frame 3.

Furthermore, in the motor 1 according to the embodiment, the lead wire 100, as a single lead wire, is wound around the inner peripheral portion 6b and outer peripheral portion 6a of the stator 6, and forms the coils 10. Accordingly, the lead wire 100 does not need to be cut for each of magnetic circuits of each phases, and the manufacture man-hour is thus able to be reduced.

Furthermore, the motor 1 according to the embodiment includes, on the inner peripheral portion 6b of the stator 6, the coils 10, and a plurality of magnetic bodies where the coils 10 are provided. The single lead wire 100 forms the coils 10. Accordingly, the lead wire 100 does not need to be cut for each of magnetic circuits for each phases, and thus the manufacture man-hour is able to be reduced, and disconnection is able to be prevented as the number of connections is reduced.

Furthermore, in the motor 1 according to the embodiment, a plurality of winding positions for the lead wire 100 wound around the outer peripheral portion 6a are provided in the rotational axis direction, and these winding positions are different from one another.

Accordingly, disconnection due to friction between parts of the lead wire 100 on the outer peripheral portion 6a of the stator 6 is able to be prevented.

Furthermore, the motor 1 according to the embodiment includes the coils 10 and the magnetic body. The magnetic body is surrounded by the coils 10. The magnetic body includes, in the rotational axis direction, the two end faces 6c and 6d opposite to the coil 10, and a side surface (the inner peripheral portion 6b) between the two end faces 6c and 6d. The end faces 6c and 6d are covered with the insulating member (the insulator 7). The side surface is covered with the insulating film 30. Accordingly, Joule heat generated from the coils 10 and the like is able to be radiated outside the stator 6 from the insulating film more efficiently than from an insulating member, and reduction of performance of the motor 1 is thus able to be prevented.

Furthermore, the motor 1 according to a modified example of the embodiment includes the rotor 8 and the stator 6. The stator 6 includes the magnetic body. The magnetic body includes the tubular core 61, and the teeth 62 extending toward the rotor 8 from the core 61. The teeth 62 include the end faces 6c and 6d and the side surfaces. A part of the end faces of the teeth 62 are covered with the insulating member. The side surfaces of the teeth 62 are covered with the insulating film 30. Accordingly, Joule heat generated from the coils 10 and the like is able to be radiated outside the stator 6 from the insulating film more efficiently than from an insulating member, and reduction of performance of the motor 1 is thus able to be prevented. The side surfaces of the teeth 62 are surfaces extending in the rotational axis direction.

Furthermore, in the motor 1 according to the modified example of the embodiment, the side surface of the core 61 is covered with the insulating film 30, the side surface being opposite to the rotor 8. Accordingly, the efficiency of heat radiation from the stator 6 to the outside is able to be improved. The side surface of the core 61 is a surface extending in the rotational axis direction.

Furthermore, in the motor 1 according to the modified example of the embodiment, in case where the end face 6c is the one end face 6c, the insulating film 30 covers the other end face 6d. Accordingly, heat is able to be prevented from being confined to the bottom surface side (the side opposite to the external terminals 4) of the frame 3.

Furthermore, in the motor 1 according to the modified example of the embodiment, the teeth 62 are arranged side by side in the circumferential direction, outside the rotor 8. Accordingly, in the motor 1 of the inner rotor type, Joule heat generated from the coils 10 and the like is able to be radiated outside the stator 6 efficiently, and reduction in performance of the motor 1 is thus able to be prevented.

Furthermore, in the motor 1 according to the modified example of the embodiment, the insulating member is provided with the terminals 45. The stator 6 includes the coils 10 surrounding a part of the magnetic body. The lead wire 100 electrically connects the terminals 45 and the coils 10 to each other. A part of the insulating member has the recessed portions 72, the part facing with the lead wire 100, and each of the recessed portions 72 and the lead wire 100 have a space between the recessed portion 72 and the lead wire 100. Accordingly, the lead wire 100 and the insulator 7a are able to be prevented from adhering to each other, and disconnection of the lead wire 100 is thus able to be prevented.

Furthermore, the motor 1 according to the modified example of the embodiment includes the frame 3 and the external terminals 4. The external terminals 4 are provided on the insulating member. A part of the outer peripheral portion 6a of the stator 6, the part being at the external terminal 4 side in the rotational axis direction, is supported by a part of the inner peripheral portion 31 of the frame 3. Accordingly, the length by which the external terminals 4 protrude from the frame 3, is able to be set accurately.

Furthermore, the motor 1 enables reduction in performance to be prevented more than a motor having a rotor and a stator surrounded by a coil and having the coil wound around the stator via an insulating member.

Furthermore, in a motor 1 having a rotor 8 and a stator 6 surrounded by a coil 10 and having the coil 10 wound around the stator 6 via an insulating member, heat generated from the coil 10 when the motor 1 is driven may be unable to be radiated outside the stator 6 efficiently. Specifically, by the insulating member insulating the heat from the coil 10, the heat stays in the stator 6. Accordingly, the resistance value of the coil 10 is increased, and the performance of the motor 1 may be reduced. However, the above described configuration enables such reduction in the performance of the motor 1 to be prevented.

Furthermore, the motor 1 according to the modified example of the embodiment includes the adhesive member. The adhesive member fixes the insulating member and the coil 10 together. Accordingly, the insulator 7a and the coil 10 are able to be prevented from being displaced from each other.

According to the above description of the embodiment, the motor 1 is a brushless motor, but the motor 1 may be another known motor, such as a brush motor, or a stepping motor.

Furthermore, the present invention is not limited by the above described embodiment. The present invention includes a configuration having a combination of any of the above described components as appropriate. Moreover, further effects and modified examples are able to be readily derived by those skilled in the art. Wider aspects of the present invention are thus not limited to the above described embodiment and various changes may be made.

REFERENCE SIGNS LIST

1 MOTOR
2 ROTATING SHAFT
3 FRAME
4 EXTERNAL TERMINAL
5 INTERNAL TERMINAL
6 STATOR
7 INSULATOR
8 ROTOR
8a YOKE
8b MAGNET
10 COIL
11a, 11b BEARING
30 INSULATING FILM
54, 63, 72 RECESSED PORTION
31a, 73a, 73b PROTRUDING PORTION
41a TO 41c, 51, 74a, 74b FIXED PORTION
42 CONNECTED PORTION
52a FIRST CONNECTED PORTION
52b SECOND CONNECTED PORTION
53 SUPPORTING PORTION
61 CORE
62 TOOTH
71a FIRST INSULATING PORTION
71b SECOND INSULATING PORTION
100 LEAD WIRE
101 FIRST PORTION
102 SECOND PORTION
610 TO 616 METALLIC MEMBER

The invention claimed is:
1. A motor, comprising:
a stator including a lead wire and including a tubular shape; and
a member including electrical conductivity is provided at the stator and extending in a circumferential direction, the member including an outer peripheral wall portion, wherein the lead wire passes through a part of the outer peripheral wall portion of the member in a radial direction and is wound around an inner peripheral portion of the stator and an outer peripheral portion of the stator, and a space is arranged between the part of the outer peripheral wall portion of the member and the lead wire.

2. The motor according to claim 1, wherein an insulating member is provided at a part of a recessed portion facing the lead wire in a rotational axis direction.

3. The motor according to claim 1, wherein a plurality of terminals are provided at the stator and arranged in a circumferential direction, the plurality of terminals include a plurality of internal terminals and a plurality of external terminals provided at an end face of the stator in a rotational axis direction, the plurality of internal terminals and the plurality of external terminals extend in the rotational axis direction, the plurality of internal terminals are provided at one side of the end face of the stator in the circumferential direction, and the plurality of external terminals are provided at another side of the end face of the stator.

4. The motor according to claim 1, wherein the lead wire is wound around the inner peripheral portion and the outer peripheral portion of the stator as a single lead wire.

5. The motor according to claim 1, comprising:

at the inner peripheral portion of the stator, a plurality of coils, and a plurality of magnetic bodies where the plurality of coils are provided, wherein the lead wire is a single lead wire forming the plurality of coils.

6. The motor according to claim 1, wherein a plurality of winding positions for the lead wire wound around the outer peripheral portion of the stator are different from one another in a rotational axis direction.

* * * * *